(12) United States Patent
Ide

(10) Patent No.: US 7,889,307 B2
(45) Date of Patent: Feb. 15, 2011

(54) LIQUID CRYSTAL OPTICAL MODULATOR AND THE PROCESS FOR PRODUCING THE SAME

(75) Inventor: Masafumi Ide, Nishitokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 939 days.

(21) Appl. No.: 11/723,787

(22) Filed: Mar. 22, 2007

(65) Prior Publication Data
US 2009/0323004 A1    Dec. 31, 2009

(30) Foreign Application Priority Data

Mar. 27, 2006  (JP) .............................. 2006-085808
Feb. 13, 2007  (JP) .............................. 2007-032533

(51) Int. Cl.
*G02F 1/1339* (2006.01)
(52) U.S. Cl. ...................... 349/153; 349/190
(58) Field of Classification Search ................. 349/153, 349/190
See application file for complete search history.

(56) References Cited

U.S. PATENT DOCUMENTS 6,122,033 A * 9/2000 Mathew et al. ............... 349/155
6,219,127 B1 * 4/2001 Hirakata et al. ............. 349/153
6,864,943 B2 * 3/2005 Hirakata et al. ............. 349/153

FOREIGN PATENT DOCUMENTS

| JP | 46449 | 5/1974 |
| JP | 4-278983 A | 10/1992 |
| JP | 2006-267532 A | 10/2006 |

* cited by examiner

*Primary Examiner*—James A Dudek
(74) *Attorney, Agent, or Firm*—Westerman, Hattori, Daniels & Adrian, LLP

(57) ABSTRACT

A space between substrates in a liquid crystal optical modulator can be sealed with a metal by using a simple configuration. In a seal structure between the substrates constituting a liquid crystal cell in a liquid crystal optical modulator, metal members are provided on the opposing surfaces of the two substrates, and the base metal surfaces of the metal members are brought into direct contract and joined. As a result, a low-melting metal such as a solder that has been conventionally introduced into the joint section becomes unnecessary, and a metal seal providing for strong bonding can be formed with a simple configuration. The liquid crystal optical modulator has a first substrate having a first electrode pattern including a pixel electrode, a second substrate having a second electrode pattern including a counter electrode, and a metal seal disposed so as to be sandwiched between the first substrate and the second substrate. The metal seal is formed between a first metal member composed of a metal material and formed on the first substrate and a second metal member composed of a metal material and formed on the second substrate by directly joining the metal surfaces of the two metal members.

19 Claims, 22 Drawing Sheets

PIXEL ELECTRODE

COUNTER ELECTRODE

FIG. 7A
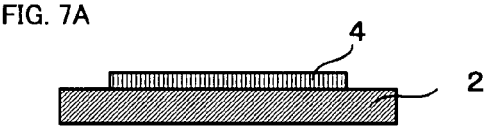
PIXEL ELECTRODE
FIG. 7B
COUNTER ELECTRODE
FIG. 7C
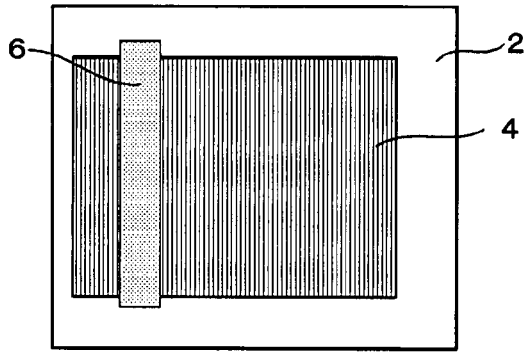
FIG. 7D
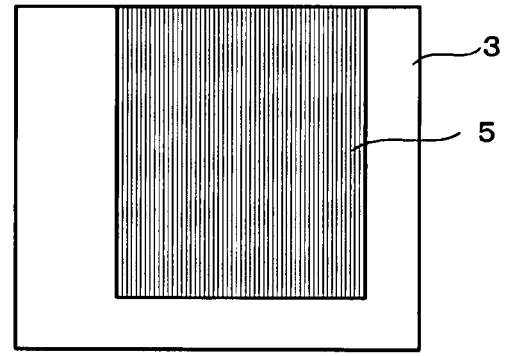
FIG. 7E
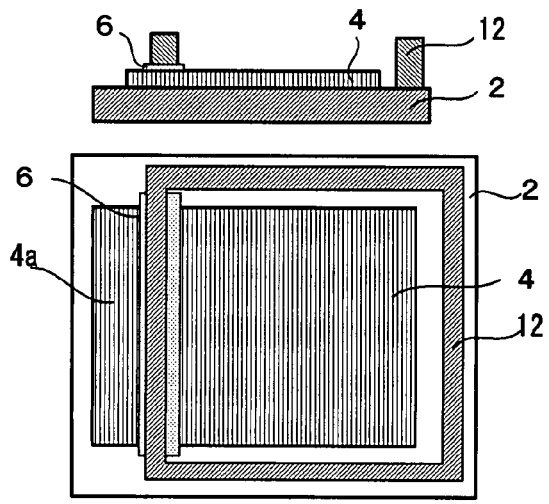
FIG. 7F
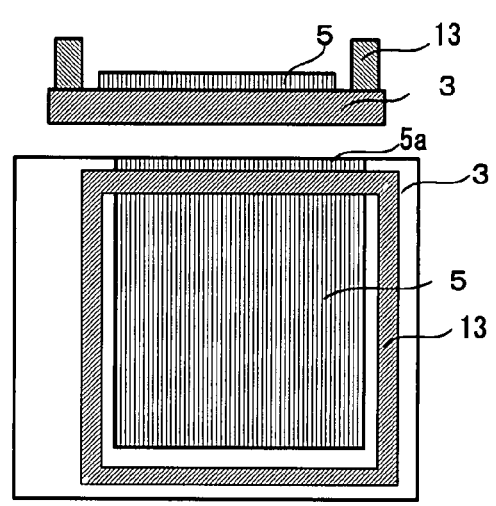

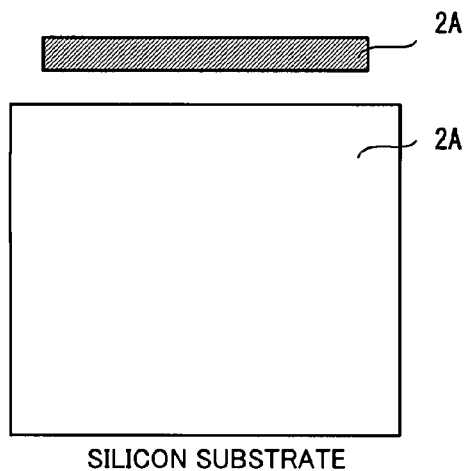
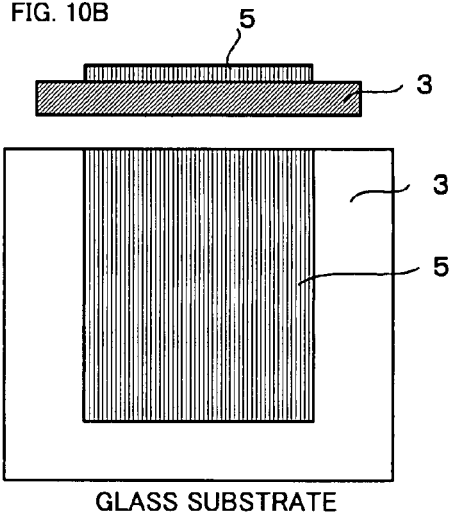
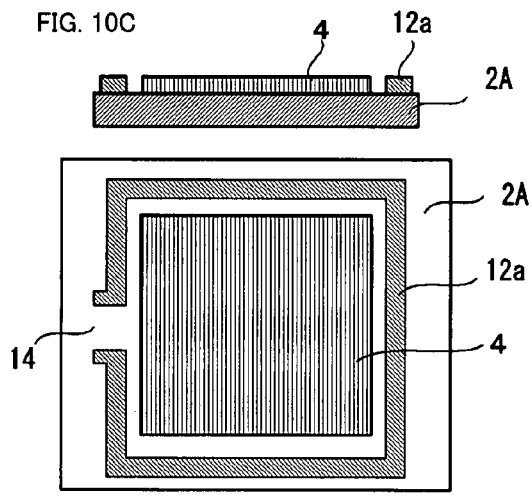
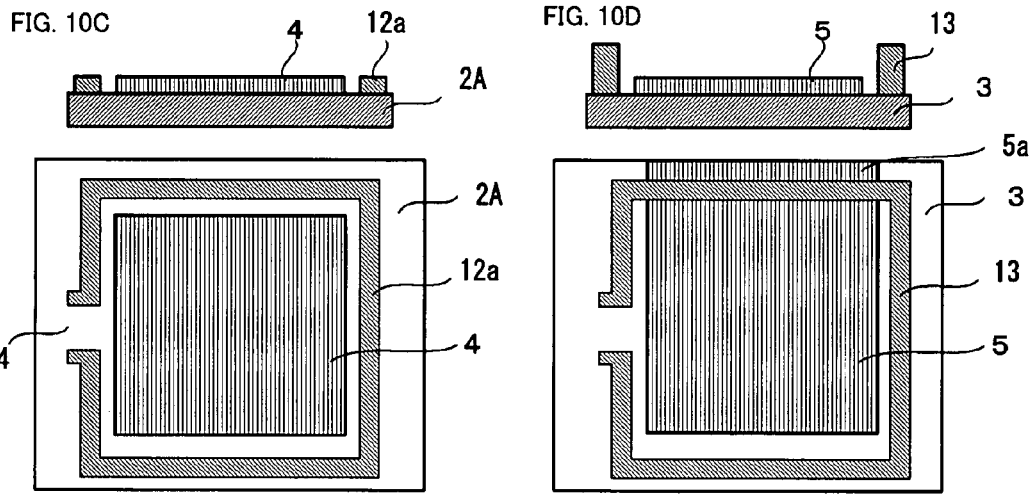
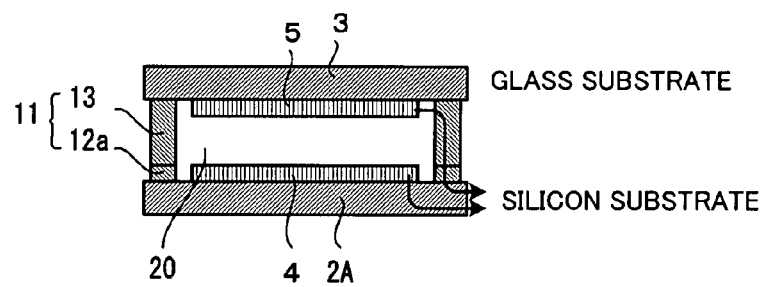

SILICON SUBSTRATE

GLASS SUBSTRATE

LIQUID CRYSTAL OPTICAL MODULATOR AND THE PROCESS FOR PRODUCING THE SAME

BACKGROUND OF THE INVENTION

1. Field of the Invention

The present invention relates to a liquid crystal optical modulator such as a liquid crystal display or liquid crystal optical switch and to a process of producing the same, and more particularly to a seal for sealing the liquid crystal.

2. Description of the Related Art

A liquid crystal optical modulator such as a liquid crystal display or liquid crystal optical switch is formed, for example, by providing a liquid crystal layer between substrates comprising electrodes.

Usually, a liquid crystal cell is formed by bonding substrates disposed with a certain gap therebetween with a resin, injecting a liquid crystal through an injection port into the space bounded by the resin and the substrates, and sealing after the injection of the liquid crystal has been completed. In the above-described configuration in which a liquid crystal is held between the substrates with a resin, a problem is associated with the degradation of liquid crystal characteristics caused by permeation of moisture into the liquid crystal layer through the resin. Another problem is that a spacer is required to set the predetermined distance between the substrates, and yet another known problem is that deformations occur due to physical properties of the resin and a narrow seal width is difficult to realize.

As a configuration that increases a moisture resistance characteristic and strength characteristic, the inventors of the present invention suggested a double sealing structure in which the periphery of the liquid crystal is double sealed with a sealing material. Japanese Patent Application Laid-open No. 2006-267532 suggests a sealing configuration that can be used over a long period under high-temperature and high-humidity conditions, in which a linear expansion coefficient of a first sealing member on the side of the liquid crystal member is made less than a linear expansion coefficient of the second sealing member provided on the outside, and the hygroscopicity of the second sealing member is made less than the hygroscopicity of the first sealing member.

In addition to the aforementioned sealing structure in which the liquid crystal layer is held by a resin seal, structures in which the sealing portions are configured of a metal have also been suggested (for example Japanese Patent Applications Laid-open No. 49-46449 and 4-278983).

In the invention of Japanese Patent Application Laid-open No. 49-46449, thin films of a high-melting metal are provided on the surfaces of both substrates, a low-melting metal such as a solder is introduced between the thin films of a high-melting metal, and the substrates are joined together by fusing at a comparatively low temperature.

Further, in invention of Japanese Patent Application Laid-open No. 4-278983, a seal is configured by providing metal films such as Al films on the surfaces of both substrates and introducing a low-melting metal such as a solder between the metal films. After the two substrates have been stacked, sealing and joining are performed by spot heating the sealing portion and melting the low-melting metal. FIG. 22 is an example of sealing configuration in which a low-melting metal such as a solder is introduced between metal films. In a liquid crystal cell 101 shown in FIG. 22, a counter electrode 104 and a pixel electrode 105 are provided on respective surfaces of upper and lower substrates 102, 103, and the substrates 102, 103 are disposed opposite each other via a spacer 109 located therebetween so that the electrodes 104, 105 face each other.

A thin film 106 of a high-melting metal is provided via an insulating layer 110 on the counter electrode 104, and a thin film 107 of a high-melting metal is provided on the pixel electrode 105 in a position facing the thin film 106 of a high-melting metal. A low-melting metal 108 such as a solder is sandwiched between the thin film 106 of a high-melting metal and the thin film 107 of a high-melting metal. The thin film 106 of a high-melting metal and the thin film 107 of a high-melting metal are joined together by melting the low-melting metal 108.

The above-described configuration in which the seal is formed from a metal, the problem of moisture permeation into the liquid crystal layer through the sealed portion is resolved, but the configurations that have heretofore been suggested require metals of two types: a high-melting metal and a low melting metal. Furthermore, a low-melting metal has to be sandwiched between the thin films of high-melting metals on the surfaces of both substrates and, therefore, the production process is complex.

It is an object of the present invention to resolve the above-described problems and to perform sealing with a metal between substrates in a liquid crystal optical modulator with a simple configuration.

SUMMARY OF THE INVENTION

The liquid crystal optical modulator in accordance with the present invention comprises two substrates having electrode patterns on opposing surfaces, the electrode patterns being arranged opposite each other, and a seal sandwiched and disposed between the substrates. The seal has metal members that are brought into direct contact and joined by base metal surfaces thereof between the metal members on the substrate sides. The metal members play the role of gap materials that maintain a predetermined distance between the substrates. The gap between the substrates that is formed thereby is used as a space for accommodating a liquid crystal layer.

In accordance with the present invention, there can be two implementation modes of the seal structure in which the space between the substrates constituting a liquid crystal cell is sealed with a metal. Common features of the two implementation modes include a structure in which base metal surfaces are brought into contact and joined to each other at the joining surfaces constituting the seal section and a structure in which the seal structure also serves as a gap material that determines the gap between the opposing substrates.

Because the metal seal serves to hold a liquid crystal inside the cell and also as a gap material of a spacer that determines the distance between the substrates of the liquid crystal cell, it is not necessary to use a separate gap material.

Furthermore, by using a metal seal, it is possible to prevent the permeation of moisture that causes deterioration of the liquid crystal layer and the seal width can be reduced by comparison with that of a resin seal.

In the metal-based seal structure of the liquid crystal optical modulator in accordance with the present invention, a configuration is employed in which metal members are provided on the opposing surfaces of two substrates and the base metal surfaces of the two metal members are brought into contact and joined to each other. As a result, a low-melting metal such as a solder that has been conventionally introduced into joining sections is unnecessary and a metal seal with strong bonding can be formed with a simple configuration.

The liquid crystal optical modulator of the first implementation mode of the present invention comprises a first substrate having a first electrode pattern including a pixel electrode, a second substrate having a second electrode pattern including a counter electrode, and a seal sandwiched and disposed between the first substrate and the second substrate.

The seal of the first implementation mode includes a first metal member comprising a metal material and formed on the first substrate and a second metal member comprising a metal material and formed on the second substrate, and the seal is formed by bringing the base metal surfaces of the two metal members into direct contact and joining with each other between the two metal members.

Such seal also serves as a gap material of a spacer that maintains a predetermined distance between two electrode patterns including the first electrode pattern and the second electrode pattern that are disposed opposite each other on the inner side and forms a space for accommodating a liquid crystal layer between the electrode patterns.

The liquid crystal optical modulator of the second implementation mode of the present invention comprises a first substrate having a first electrode pattern including a pixel electrode, a second substrate having a second electrode pattern including a counter electrode, and a seal sandwiched and disposed between the first substrate and the second substrate.

The seal of the second implementation mode has a metal seal section comprising a metal material that is joined to both substrate surfaces of the first substrate and the second substrate and a resin seal section that covers the circumference of the metal seal section. In the metal seal section, metal members are disposed between the first substrate and the second substrate, and at the metal surfaces of the metal members and two substrates, base metal surfaces of the two metal members are brought into direct contact and joined with each other. On the other hand, the resin seal section is tightly attached to the circumference of the metal seal section and the substrates by a resin material.

The metal seal section serves as a gap material of a spacer that maintains a predetermined distance between two electrode patterns including the first electrode pattern and the second electrode pattern that are disposed opposite each other on the inner side and forms a space for accommodating a liquid crystal layer between the electrode patterns.

The liquid crystal optical modulators of the first implementation mode and second implementation mode of the present invention have the following common structures and operations.

Both metal members are formed of a metal material comprising aluminum as the main component. Further, by using a material that has a small difference in linear expansion coefficient with the substrates, it is possible to reduce strains caused by thermal deformation. For example, in the case of a glass substrate, metal materials with low thermal expansion that are obtained by alloying iron with nickel, for example, Kovar, Invar and SuperInvar can be used.

The first electrode pattern can be formed from a metal material comprising aluminum as a main component, the second electrode pattern can be formed from a transparent electrically conductive film, and the second substrate can be a transparent substrate.

Further, instead of forming both the first substrate and the second substrate from transparent substrates such as glass substrates, the second substrate can be a transparent substrate and the first substrate can be a silicon substrate. When both the first substrate and the second substrate are transparent substrates, the liquid crystal optical modulator can be of a transmission type, and when the first substrate is a silicon substrate, a circuit can be formed on the silicon substrate, and an LCOS (liquid crystal on silicon) can be configured.

The liquid crystal optical modulator in accordance with the present invention can be configured by taking a laminate of the first substrate, second substrate, and seal as a structural unit, and stacking and laminating a plurality of the laminates to obtain a multilayer structure in the lamination direction. In the multilayer laminate, a first substrate of one laminated body from amongst adjacent laminated bodies and a second substrate of another laminated body may be configured of one common substrate.

The liquid crystal optical modulator of the first implementation mode of the present invention has the following configuration and operation.

In the case of a configuration in which the first substrate is a silicon substrate and a liquid crystal layer is formed on the silicon substrate, the pixel electrode formed on the silicon substrate and the first metal member constituting the seal are formed, for example, from thin films of Al to the same film thickness. In such configuration, the space portion of the liquid crystal cell is mainly formed by the second metal member provided on the second substrate.

The seal structure of the liquid crystal optical modulator in accordance with the present invention can be applied to either of a configuration in which the injection of liquid crystal into the liquid crystal cell is performed via an injection port provided in the seal portion, or of a configuration in which no injection port is provided in the seal portion and the liquid crystal is dripped.

In the case where a liquid crystal cell is formed by the substrates and the seal portion and the liquid crystal is then injected into the liquid crystal cell, the seal has to have an injection port for injecting the liquid crystal into the liquid crystal cell.

Accordingly, in the configuration comprising an injection port, the seal is a frame-like body having the injection port. The side section of the frame-like body is formed so that the inside of the frame-like body is closed, except an open section in a portion thereof, by a side wall of the first metal member or by a side wall of the first metal member and a side wall of the second metal member. The open section that remained unclosed serves as an injection port for injecting the liquid crystal into the frame-like body.

Where the first substrate and the second substrate are disposed opposite each other and the first metal member and the second metal member are joined, the two metal members form the frame-like body that holds and seals a liquid crystal layer inside thereof and also form an injection port for the liquid crystal.

When the injection port is formed only by an open section formed in the side wall of the first metal member, the second metal member can be in the form of a closed frame-like body that comprises no open section.

When the injection port is formed by open sections provided in the side wall of the first metal member and the side wall of the second metal member, the positions of the open section in the first metal member and the open section in the second metal member are aligned.

Further, the side wall of the first metal member forming the open section, or the side wall of the first metal member and the side wall of the second metal member forming the open section are caused to protrude in the direction of extension from the open section and a conduction path connecting the inside of the seal with the outside is formed by the protruding section.

The injection port is formed by a resin after the liquid crystal has been injected inside. Therefore, with the configuration in which an injection port is provided, the liquid crystal layer located inside the liquid crystal cell is partitioned from the outside with a resin, rather than the metal member, only in the portion corresponding to the injection port, and there is a risk of moisture permeating into the liquid crystal layer from the outside through the resin portion. However, because the injection port in accordance with the present invention comprises the above-described protruding section, the distance between the liquid crystal layer located inside the liquid crystal cell and the outside zone can be increased by the length of the protruding section. Therefore, the permeation of moisture from the outside into the liquid crystal layer that can proceed through the resin portion can be reduced.

The protruding section can form a lead-out electrode in which a portion of the electrode formed on the substrate is led out to the outside of the seal, without contact with the seal. If the lead-out electrode is formed by extending an electrode on the substrate to the outside of the portion where the seal is formed and the seal is formed on the lead-out electrode, the lead-out electrode and the seal come into electric contact and the first electrode and second electrode that are formed on the first substrate and second substrate, respectively, are short circuited. However, the first electrode and second electrode can be prevented from being short circuited by leading out the protruding portion in accordance with the present invention to the outside of the electrodes.

By contrast with the process of injecting a liquid crystal by using the above-described injection hole, the injection of liquid crystal by dripping is performed by dripping the liquid crystal into the frame-like body constituting the seal portion, then joining the two substrates together and sealing, and degassing the liquid crystal inside the sealed frame-like body.

In the configuration in which liquid crystal injection is performed without using an injection port, the seal is a frame-like body that is closed over the entire perimeter of the side portion, and the side portion of the frame-like body closes the inside of the frame-like body by the side wall of the first metal member or by the side wall of the first metal member and the side wall of the second metal member. On the other hand, the frame-like body is closed from above and below with the first substrate and second substrate.

In the configuration that comprises no injection port, the entire perimeter of the frame-like body is closed by the wall sections and the injection of liquid crystal is performed in a closed state. Therefore, resin sealing of the injection port is unnecessary.

The configuration and operation of the liquid crystal optical modulator of the first implementation mode of the present invention described herein below are almost identical when the first metal member and second metal member of the first implementation mode are replaced with the metal seal section and resin seal section of the second implementation mode.

Further, the following electrode configuration and operation can be demonstrated in the first implementation mode and second implementation mode.

In accordance with the present invention, the lead-out electrode that is formed inside the frame-like body to lead the electrode to the outside is implemented in a variety of modes.

In one mode of the lead-out electrode, the first electrode pattern or the second electrode pattern, or both electrode patterns form a lead-out electrode by extending the electrode from the inside of the seal to the outside thereof on the substrate. An insulating film is provided between the lead-out electrode and the metal member forming the seal, and the lead-out electrode and the seal are insulated from each other.

As a result, where the seal is formed directly on the lead-out electrode when the lead-out electrode is led out to the outside of the seal, the lead-out electrode and the seal come into electric contact and the electrodes that are formed on the first substrate and second substrate are short circuited. By providing the insulating film, the pixel electrode of the first electrode pattern and the counter electrode of the second electrode pattern can be prevented from being short circuited.

In another implementation mode of the lead-out electrode, using the seal as a conduction section provides for the conduction from the counter electrode to the substrate where the pixel electrode is formed.

In this implementation mode, the counter electrode of the second electrode pattern forms a lead-out electrode by extending the electrode from the inside of the seal to the outside thereof on the substrate, the lead-out electrode and the seal are electrically connected to each other by forming a metal member that forms the seal on the lead-out electrode, and the conduction from the counter electrode of the second electrode pattern to the substrate where the pixel electrode pattern is formed is provided through the metal member forming the seal.

The substrate where the pixel electrode is formed is, for example, a silicon substrate, and the pixel electrode and the counter electrode that is led through the seal can pass through the so-called conduction path such as a via hole or a through hole formed in the thickness direction of the substrate, whereby the two electrodes can be wired without being short circuited.

The following operation can be demonstrated in the first and second implementation modes.

In the seal structure in accordance with the present invention, the metal surfaces of the metal members provided on the two opposing substrates are joined by applying pressure and supplying ultrasonic waves to the metal surfaces in a contact state thereof.

In the joining in accordance with the present invention performed by bringing the base metal surfaces of the metal members in direct contact with each other, natural oxide films formed in a natural state on the metal surfaces can be removed by the supply of ultrasonic waves, whereby the joining surfaces assume a state without the oxidation films and the bonding strength is increased.

Even in the case where an orientation film is formed on the metal members of the seal when the orientation film is formed on the electrodes before the liquid crystal is injected, the orientation film present on the metal surface is removed by the supply of ultrasonic waves. Therefore, a process and mechanism for removing the orientation film present on the metal surface are unnecessary and a step of removing the orientation film can be included in the process of joining the metal members.

In the liquid crystal optical modulator in accordance with the present invention, the space between the substrates can be sealed with a metal by using a simple configuration.

With the liquid crystal optical modulator in accordance with the present invention, by enclosing the liquid crystal layer with a metal seal, the permeation of moisture that causes deterioration of the liquid crystal layer can be prevented and reliability can be increased.

With the liquid crystal optical modulator in accordance with the present invention, the metal seal also serves as a gap material between the substrates. Therefore, a spacer for maintaining the space of the liquid crystal cell is unnecessary.

With the liquid crystal optical modulator in accordance with the present invention, the metal seal makes it possible to decrease the seal width by comparison with that obtained with a resin seal.

With the liquid crystal optical modulator in accordance with the present invention, the amount of external wiring can be reduced because the metal seal can be used as a conduction section.

With the liquid crystal optical modulator in accordance with the present invention, by dripping a liquid crystal under vacuum, a configuration can be obtained in which no injection port is required, permeation of moisture via the injection port can be prevented, and reliability can be increased.

BRIEF DESCRIPTION OF THE DRAWINGS

FIG. 7 is a cross-sectional view for explaining the second configuration example of the liquid crystal optical modulator in accordance with the present invention;

FIG. 10 is a cross-sectional view and a plan view for explaining the third configuration example of the liquid crystal optical modulator in accordance with the present invention;

DESCRIPTION OF THE PREFERRED EMBODIMENTS

The liquid crystal optical modulator in accordance with the present invention will be described below in greater detail with reference to the appended drawings. First to fifth configuration examples of the liquid crystal optical modulator in accordance with the present invention will be described below.

Figure 3:
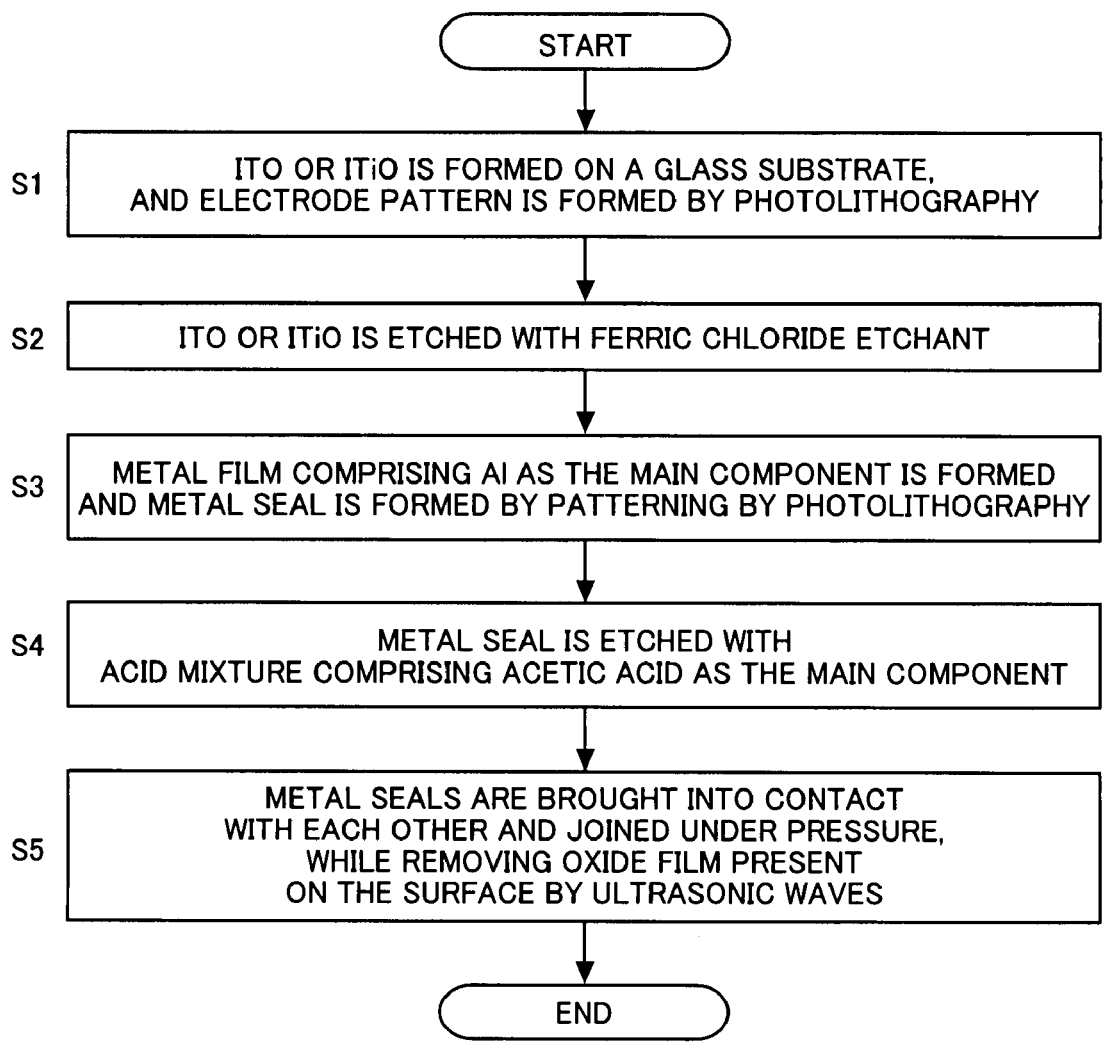
FIG. 3 is a flow chart for explaining the production sequence in the case of a glass substrate.
Figure 4:
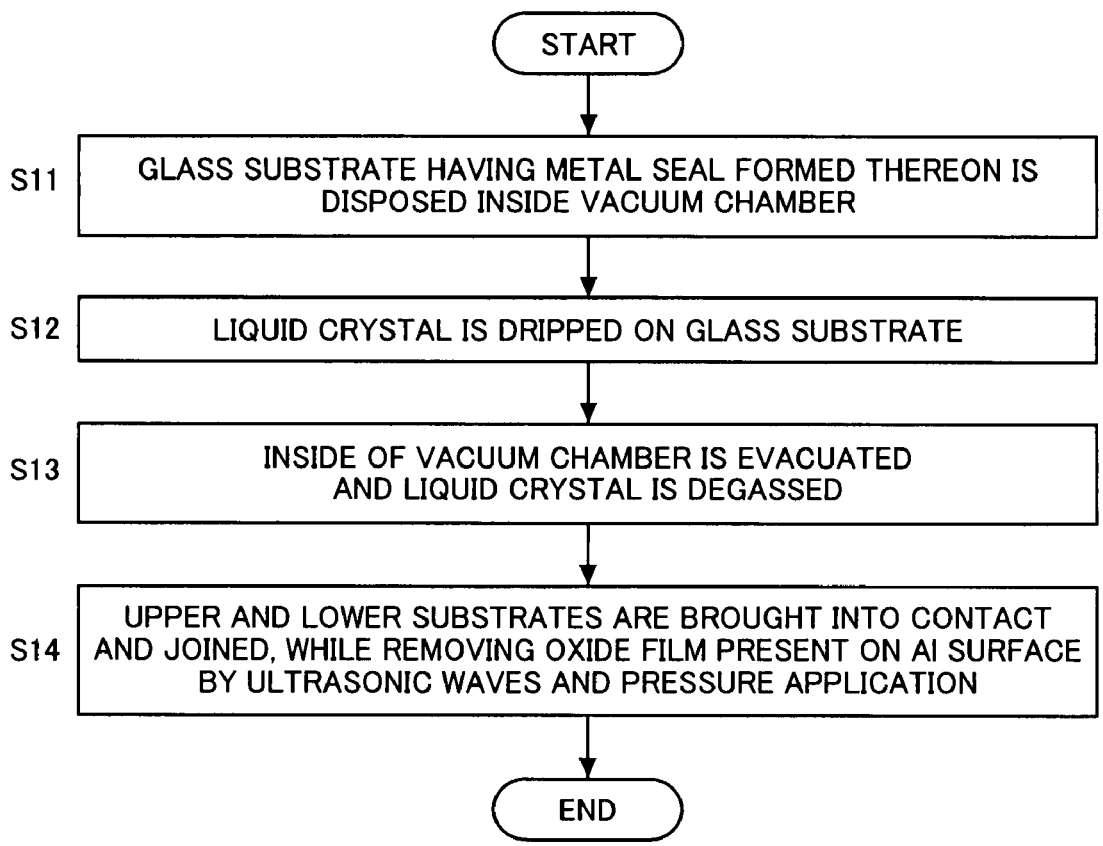
FIG. 4 is a flow chart for explaining the production sequence in the case of LCOS.
Figure 5:
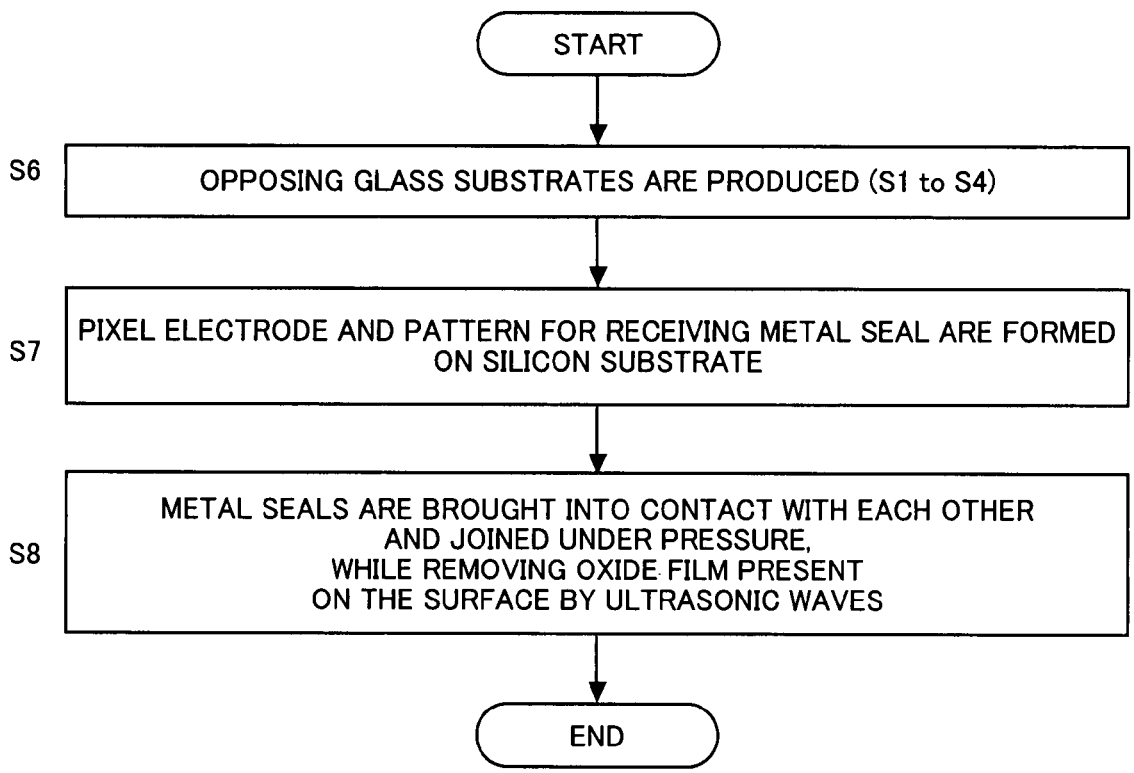
FIG. 5 is a flowchart for explaining the sequence of liquid crystal injection by dripping.

FIGS. 1, 2 are a schematic perspective view, a cross-sectional view, and a plan view for explaining the first configuration example of the liquid crystal optical modulator in accordance with the present invention. FIGS. 6 to 8 are a schematic perspective view, a cross-sectional view, and a plan view for explaining the second configuration example of the liquid crystal optical modulator in accordance with the present invention. FIGS. 9, 10 are a schematic perspective view, a cross-sectional view, and a plan view for explaining the third configuration example of the liquid crystal optical modulator in accordance with the present invention. FIGS. 11 to 14 are a schematic perspective view, a cross-sectional view, and a plan view for explaining the fourth and fifth configuration examples of the liquid crystal optical modulator in accordance with the present invention. FIG. 3 is a flowchart for explaining the production sequence in the case of a glass substrate. FIG. 4 is a flow chart for explaining the production sequence in the case of LCOS. FIG. 5 is a flowchart for explaining the sequence of liquid crystal injection by dripping. FIGS. 15, 16 illustrate the production sequence of a configuration example of a multilayer structure.

Initially, the first configuration example of the present invention will be described with reference to FIGS. 1, 2. In the first configuration example, a pixel electrode is formed on one of the two glass substrates and a counter electrode is formed on the other substrate, and a metal seal provided between the two glass substrates has a configuration enabling the injection of a liquid crystal through an injection port.

Figure 1A:
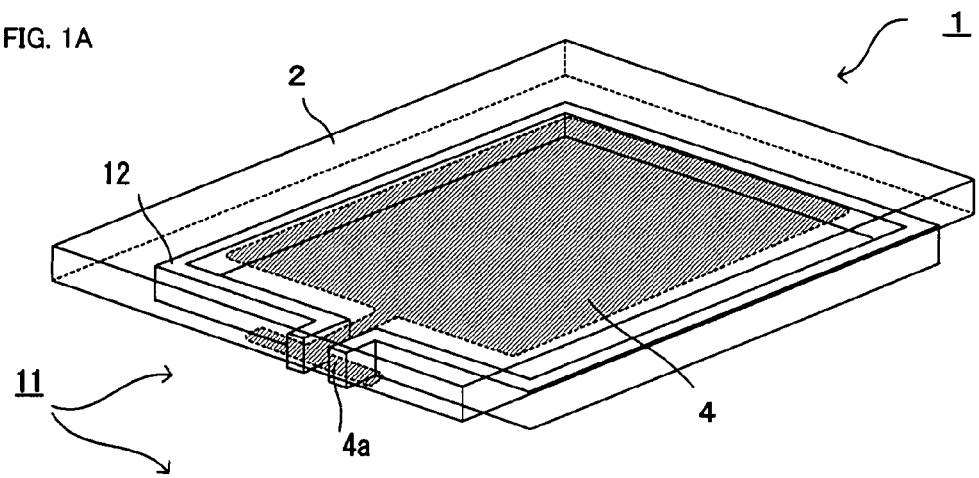
FIG. 1 is a schematic perspective view for explaining the first configuration example of the liquid crystal optical modulator in accordance with the present invention.
Figure 1B:
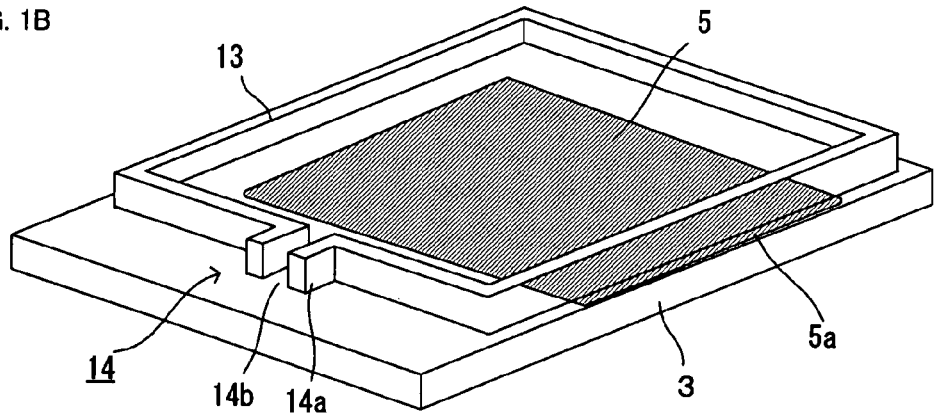
Figure 1C:
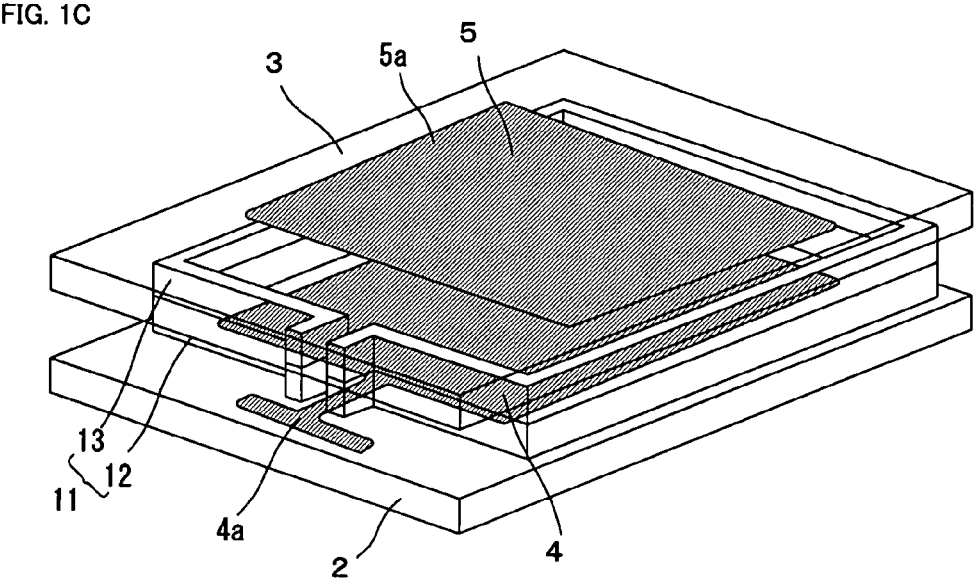

FIG. 1 is a perspective view illustrating schematically the first configuration example of a liquid crystal optical modulator 1. FIG. 1A shows a first substrate 2 in which a first electrode (pixel electrode) 4 is formed, FIG. 1B shows a second substrate 3 in which a second electrode (counter electrode) 5 is formed, and FIG. 1C shows a state in which the second substrate 3 is disposed on the first substrate 2 so that a metal seal 11 is sandwiched between the substrates.

In the first substrate 2, a pixel electrode pattern is formed from ITO or ITiO (titanium-doped indium oxide) on a transparent substrate such as a glass substrate, and then a first metal member 12 is deposited by using Al (aluminum) or the like. Further, in the second substrate 3, similarly to the first substrate 2, a counter electrode pattern is formed from ITO or ITiO on a transparent substrate such as a glass substrate, and then a second metal member 13 is deposited from Al (aluminum) or the like.

Here, the metal seal 11 is configured by bringing the metal surface of the first metal member 12 and the metal surface of the second metal member 13 into direct contact with each other and joining the two surfaces. In the metal seal 11 of the first configuration example, a side wall section is configured for holding a liquid crystal layer inside thereof. The side wall section forms a frame-like body having an open section for forming an injection port. The frame-like body is closed from above and below with the first substrate 2 and the second substrate 3 to form a liquid crystal cell.

The metal seal 11 of the first configuration example comprises an injection port 14 for injecting a liquid crystal. The injection port 14 can be configured by forming an open section in a portion of a side wall section of either both metal members or any one metal member of the first metal member 12 and the second metal member 13. In the configuration in which both the first metal member 12 and the second metal member 13 comprise an open section, the open sections are formed so that the positions of the two open sections match when the metal members are disposed opposite each other. As a result, where the base metal surfaces of the first metal member 12 and the second metal member 13 are directly brought into contact and joined, only the open sections remain non-joined and the injection port 14 is formed.

Furthermore, in the configuration in which the open section is provided in any one metal member, the other metal member that is disposed opposite the metal member having the open section has a closed configuration over the entire perimeter and comprises no open section. As a result, where the base metal surfaces of the first metal member 12 and the second metal member 13 are directly brought into contact and joined, the injection port 14 is formed only by the open section of one metal member. Further, FIG. 1 shows a configuration in which open sections are provided in both the first metal member 12 and the second metal member 13.

In the configuration shown in FIG. 1, the injection port 14 comprises a wall section 14a obtained by causing part of the wall section of the metal member to protrude outwardly. The frame-like body of the metal members comprises wall sections 14a protruding at both ends thereof, and the two wall sections 14a form the portion sandwiched therebetween as an open section 14b. This open section 14b is linked to the inside of the frame-like body.

By creating the injection port 14 that comprises a portion that communicates the inside of the liquid crystal cell having a protruding wall section 14a formed therein with the outside of the liquid crystal cell, the injection port is used as an injection channel for injecting the liquid crystal into the cell and also as a sealing port that serves to seal the injection port with a resin seal or the like after the injection has been completed. When such sealing is performed, the protruding portion is filled with the resin seal. As a result, the length of the resin portion between the liquid crystal layer and the external portion can be increased by the length of the protruding portion and the permeation of moisture into the liquid crystal layer can be reduced.

In the first electrode 4 shown in FIG. 1A, a lead-out electrode 4a is led out to the outside via the open section 14b of the injection port 14. The first electrode 4 and lead-out electrode 4a are electrically insulated from the first metal member 12 of the metal seal 11.

Further, in the second electrode 5 shown in FIG. 1B, a lead-out electrode 5a is led to the outside through a space between the second metal member 13 of the metal seal 11 and the second substrate 3. The lead-out electrode 5a is in contact with the second metal member 13 of the metal seal 11, but because the first metal member 12 that is joined to the second metal member 13 is electrically insulated from the first electrode 4, as described hereinabove, the short circuit between the second electrode 5 and the first electrode 4 is prevented.

FIG. 1C shows a state in which the first substrate 2 is below and the second substrate 3 is above.

Further, in the configuration shown in FIG. 1, the lead-out electrode 5a may be also formed from the second electrode 5 through the open section 14b of the injection port 14 shown in FIG. 1B.

The production sequence of the first configuration example of the present invention will be explained below with reference to the flowchart shown in FIG. 2 and FIG. 3.

Figure 2A:
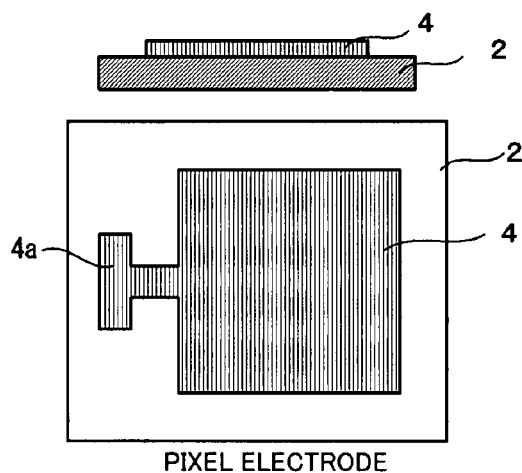
FIG. 2 is a cross-sectional view and a plan view for explaining the first configuration example of the liquid crystal optical modulator in accordance with the present invention.
Figure 2B:
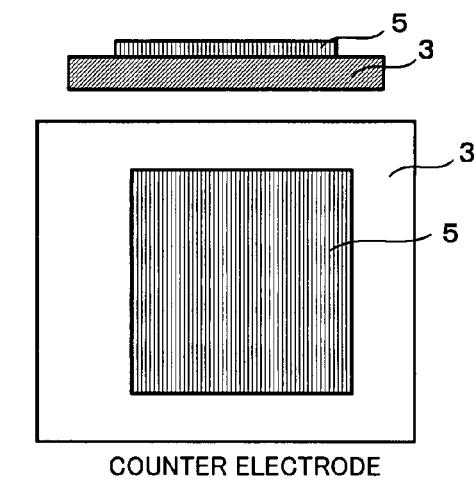
Figure 2C:
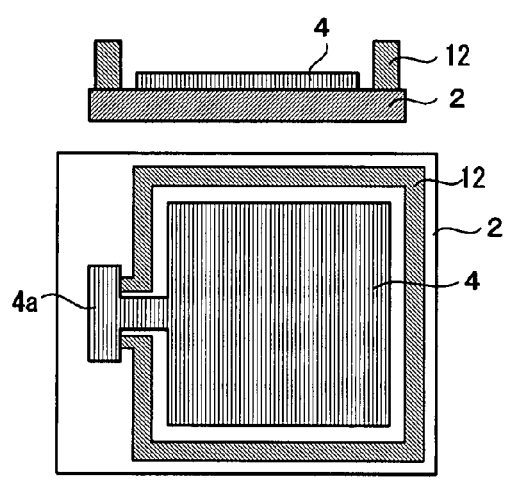
Figure 2D:
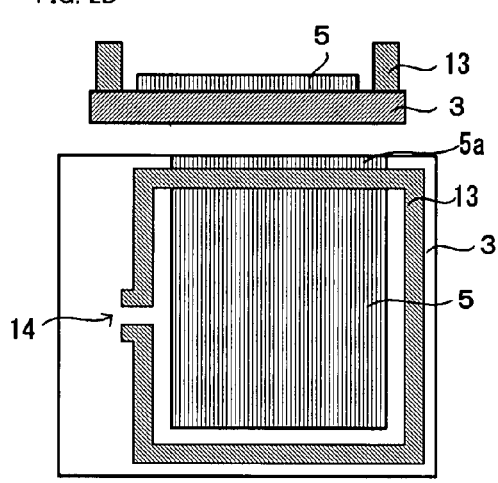

FIGS. 2A and 2C show a portion of the production sequence of the first substrate. FIGS. 2B and 2D show a portion of the production sequence of the second substrate. ITO or ITiO is formed on a glass substrate, an electrode pattern is formed by photolithography (S1), and the formed ITO or ITiO pattern is etched with a ferric chloride etchant (S2). FIG. 2A shows a state after the first electrode (pixel electrode) 4 has been formed on the first substrate 2. FIG. 2B shows a state after the second electrode (counter electrode) 5 has been formed on the second substrate 3.

Then, a metal film comprising Al (aluminum) as the main component is formed, and a metal member of a frame-like pattern is formed by photolithography (S3). The formed metal member is etched with an acid mixture comprising acetic acid as the main component (S4). FIG. 2C shows a state after the first metal member 12 has been formed on the first substrate 2. Here, a configuration is shown in which the lead-out electrode 4a is led out through an open section formed in the first metal member 12.

FIG. 2D shows a state after the second metal member 13 has been formed on the second substrate 3. Here, the lead-out electrode 5a is led out via the space between the second metal member 13 and the second substrate 3. A bonding layer from In or the like may be formed on the joining surface of the first and second metal members 12, 13.

After the first and second metal members 12, 13 have been formed, an orientation film (not shown in the figure) is formed on the inner portion of the frame-like body where the electrodes have been formed.

The metal surfaces of the first metal member 12 and second metal member 13 of the first substrate 2 and second substrate 3, respectively, that were formed in the above-described manner are brought into contact and the metal surfaces are directly joined to each other, while removing the oxide film present on the contact surfaces by supplying ultrasonic waves to the contact portion. The joining can be also performed by thermal fusion under pressure. The formation of the metal seal may be also performed under vacuum (S5).

Figure 2E:
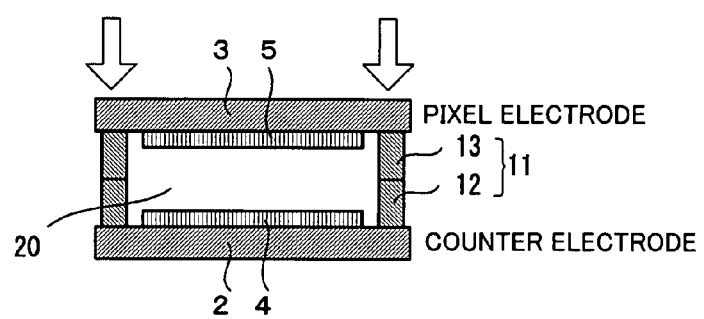

A space 20 for holding a liquid crystal layer is thus formed by the frame-like body configured by the metal seal 11 formed by the first metal member 12 and the second metal member 13 and by the upper and lower first and second substrates 2, 3. A liquid crystal is injected into this space 20 via the injection port 14 (FIG. 2E). Upon completion of the liquid crystal injection, the injection port 14 is sealed, e.g., with a resin seal such as a UV epoxy resin.

The second configuration example in accordance with the present invention will be described below with reference to FIGS. 6 to 8. In the second configuration example, in a configuration in which a pixel electrode is formed on one of two glass substrates and a counter electrode is formed on the other substrate, the metal seal provided between the two glass substrates has no injection port and the injection of liquid crystal is performed by dripping.

Figure 6A:
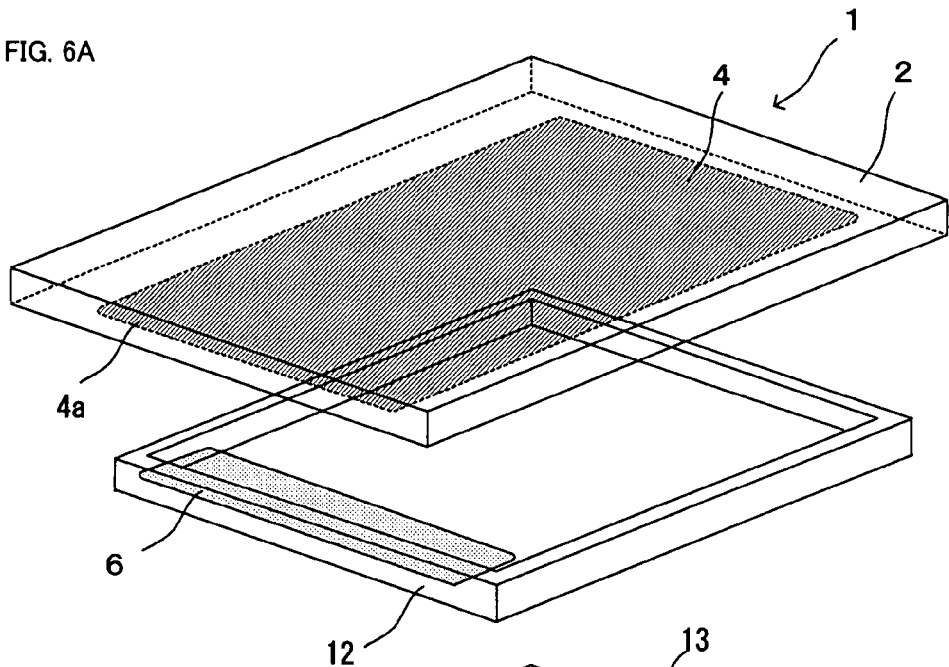
FIG. 6 is a schematic perspective view for explaining the second configuration example of the liquid crystal optical modulator in accordance with the present invention.
Figure 6B:
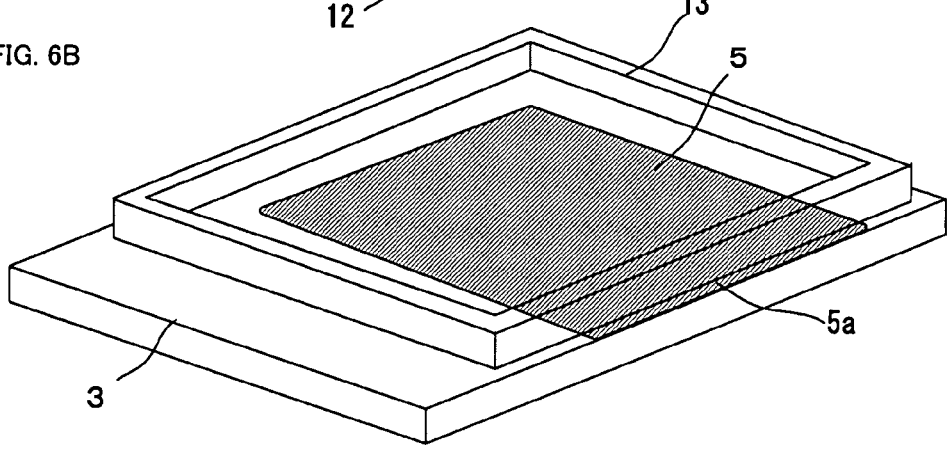
Figure 6C:
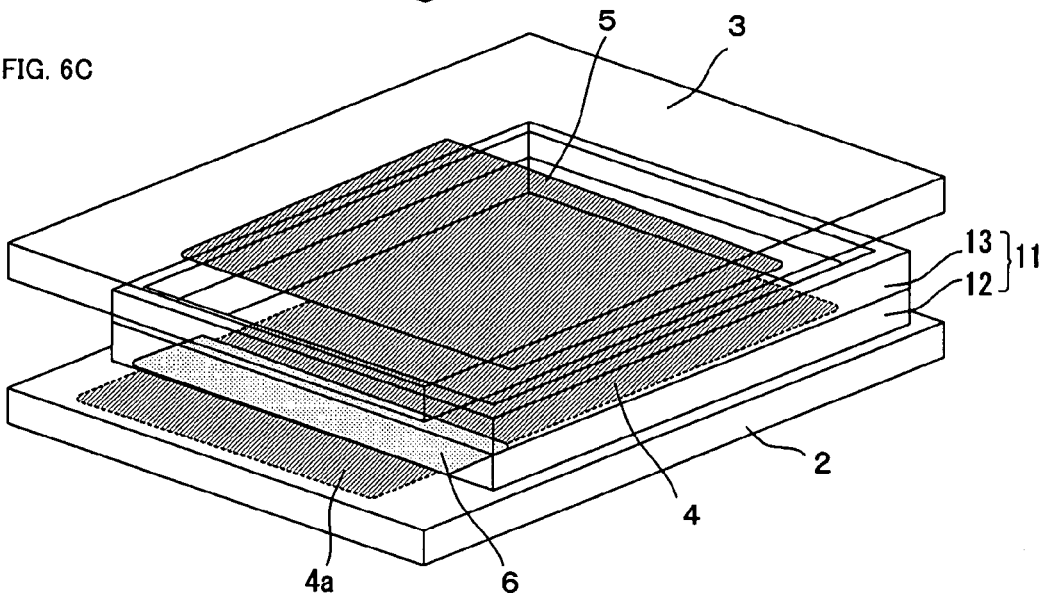

FIG. 6 is a perspective view illustrating schematically the second configuration example of a liquid crystal optical modulator 1. FIG. 6A shows a first substrate 2 in which a first electrode (pixel electrode) 4 is formed, FIG. 6B shows a second substrate 3 in which a second electrode (counter electrode) 5 is formed, and FIG. 6C shows a state in which the second substrate 3 is disposed on the first substrate 2 so that a metal seal 11 is sandwiched between the substrates.

In the first substrate 2, a pixel electrode pattern is formed from ITO or ITiO on a transparent substrate such as glass substrate, and then a first metal member 12 is deposited by using Al (aluminum) or the like. Further, in the second substrate 3, similarly to the first substrate 2, a counter electrode pattern is formed from ITO or ITiO on a transparent substrate such as a glass substrate, and then a second metal member 13 is deposited from Al (aluminum) or the like.

Here, the metal seal 11 is configured by bringing the metal surface of the first metal member 12 and the metal surface of the second metal member 13 into direct contact with each other and joining the two surfaces. In the metal seal 11 of the second configuration example, a side wall section is configured for holding a liquid crystal layer inside thereof. The side wall section forms a frame-like body that is closed along the entire perimeter. The frame-like body is closed from above and below with the first substrate 2 and second substrate 3 to form a liquid crystal cell.

The metal seal 11 of the second configuration example comprises no injection port 14 for injecting a liquid crystal that was described in the first configuration example and configures a frame-like body that is closed along the entire perimeter.

In the second configuration example, an insulating film 6 is provided as a configuration for leading an electrode provided inside the liquid crystal cell to the outside of the metal seal 11. In the first electrode 4 shown in FIG. 6A, the electrode extends to the outside of the position where the first metal member 12 is located, a lead-out electrode 4a is led out, and an insulating film 6 is formed between this electrode and the first metal member 12 at least in the portion where the two overlap. By this insulating film 6, the first electrode 4 and lead-out electrode 4a are prevented from coming into electric contact with the first metal member 12 of the metal seal 11.

In the second electrode 5 shown in FIG. 6B, a lead-out electrode 5a is led out to the outside via a space between the second metal member 13 of the metal seal 11 and the second substrate 3. This lead-out electrode 5a is in contact with the second metal member 13 of the metal seal 11, but because the first metal member 12 that is in contact with the second metal member 13 is electrically insulated from the first electrode 4 by the insulating film 6, as described hereinabove, the second electrode 5 and the first electrode 4 are prevented from being short circuited.

FIG. 6C shows a state in which the first substrate 2 is below and the second substrate 3 is above.

Further, in the configuration shown in FIG. 6, the insulating film 6 may be provided not only between the first substrate 2 and the first metal member 12, but also between the second substrate 3 and the second metal member 13 or in both locations.

The production sequence of the second configuration example of the present invention will be explained below with reference to the flowchart shown in FIGS. 7, 8 and FIG. 3.

FIGS. 7A, 7C, 7E show a portion of the production sequence of the first substrate, and FIGS. 7B, 7D, 7F show a portion of the production sequence of the second substrate. ITO or ITiO is formed on a glass substrate, an electrode pattern is formed by photolithography (S1), and the formed ITO or ITiO pattern is etched with a ferric chloride etchant (S2). FIG. 7A shows a state after the first electrode (pixel electrode) 4 has been formed on the first substrate 2. FIG. 7B shows a state after the second electrode (counter electrode) 5 has been formed on the second substrate 3.

Then, the insulating film 6 for short circuit prevention is formed on the electrode. Here, FIG. 7C shows an example in which the insulating film 6 is formed on the first electrode (pixel electrode) 4. The insulating film 6 is located on the first electrode (pixel electrode) 4 and is formed at least in a position on which the first metal member 12 overlaps, thereby preventing the first electrode (pixel electrode) 4 and the first metal member 12 from being short circuited. FIG. 7D illustrates an example in which the insulating film 6 is not formed on the second electrode (counter electrode) 5, but the insulating film 6 may be formed herein in the same manner as on the first electrode 4.

Then, a metal film comprising Al (aluminum) as the main component is formed, and a metal member of a frame-like pattern is formed by photolithography (S3). The formed metal member is etched with an acid mixture comprising acetic acid as the main component (S4).

FIG. 7E shows a state after the first metal member 12 has been formed on the first substrate 2. Because the insulating film 6 is provided in the portion where the first metal member 12 overlaps the first electrode (pixel electrode) 4, the first metal member 12 and the first electrode (pixel electrode) 4 are prevented from being short circuited. As a result, the lead-out electrode 4a of the first electrode (pixel electrode) 4 can be led out to the outside of the metal seal 11.

FIG. 7F shows a state after the second metal member 13 has been formed on the second substrate 3. The lead-out electrode 5a is led out via the space between the second metal member 13 and the second substrate 3. Here, an example is shown in which an insulating film is not provided between the second metal member 13 and the second substrate 3, but a configuration may be employed in which the insulating film 6 is provided in the same manner as on the first substrate 2. A bonding layer from In or the like may be formed on the joining surface of the first and second metal members 12, 13.

After the first and second metal members 12, 13 have been formed, an orientation film (not shown in the figure) is formed on the inner portion of the frame-like body where the electrodes have been formed.

Because the metal seal 11 of the second configuration example has no injection port for injecting a liquid crystal into the liquid crystal cell, the liquid crystal is injected by dripping. FIG. 4 is a flowchart illustrating the injection of liquid crystal by dripping.

The substrate with the metal member formed thereon is disposed in a vacuum chamber (S11), and a liquid crystal is dripped on the substrate (S12). After the liquid crystal has been dripped, the inside of the vacuum chamber is evacuated and the liquid crystal is degassed. By controlling the amount of liquid crystal, the initial state can be controlled to a negative or positive pressure (S13).

The metal surfaces of the first metal member 12 and second metal member 13 of the first substrate 2 and second substrate 3, respectively, that were formed in the above-described manner are brought into contact and the metal surfaces are directly joined together under pressure, while removing the oxide film present on the contact surfaces by supplying ultrasonic waves to the contact portion. The joining can be also performed by thermal fusion.

In this process, even if the orientation film or an excess amount of the liquid crystal that was injected by dripping remains on the metal surfaces of the metal members that serve as the joining surfaces, they are removed together with a natural oxidation film by applying the ultrasonic waves to the contact surface. The formation of the metal seal may be also performed under vacuum (S14).

Figure 8A:
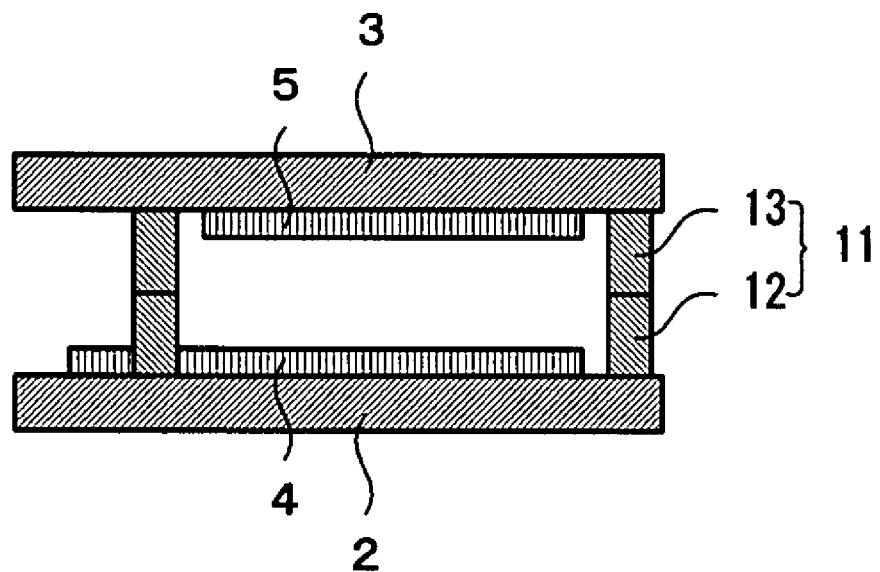
FIG. 8 is a plan view for explaining the second configuration example of the liquid crystal optical modulator in accordance with the present invention.
Figure 8B:
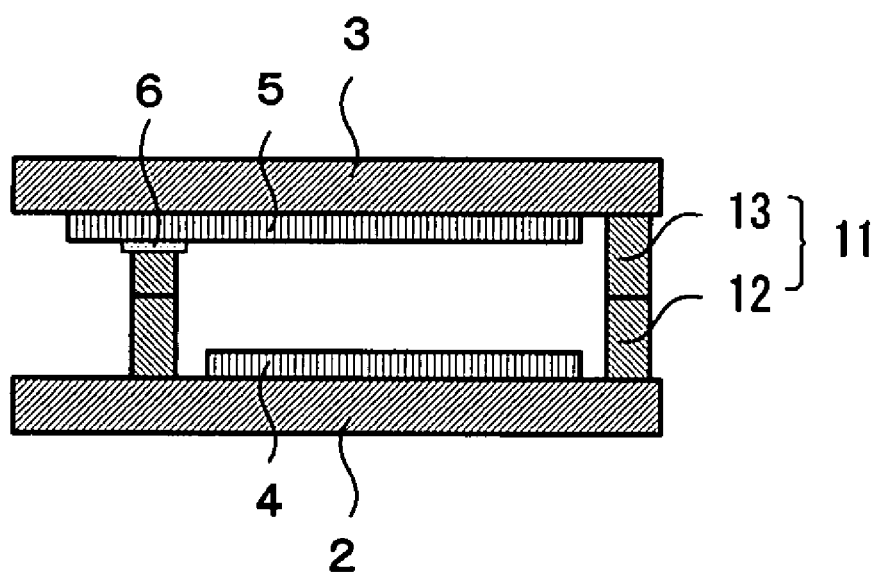

FIG. 8 illustrates a cross-sectional state of the second configuration example. FIG. 8A shows a cross-sectional state of the portion where no insulating film was formed. FIG. 8B shows a cross-sectional state of the portion where the insulating film was formed.

The third configuration example of the present invention will be described below with reference to FIGS. 9, 10. In the third configuration example, one substrate is a glass substrate, a pixel electrode is formed on the glass substrate, the other substrate is a silicon substrate, and a counter electrode is formed on the silicon substrate. The metal seal provided between the glass substrate and silicon substrate has a configuration enabling the injection of a liquid crystal via an injection port.

The third configuration example can employ a reflection-type display element of an LCOS (liquid crystal on silicon type) in which one substrate is a silicon substrate and a CMOS circuit such as a drive circuit is formed on the silicon substrate.

Figure 9A:
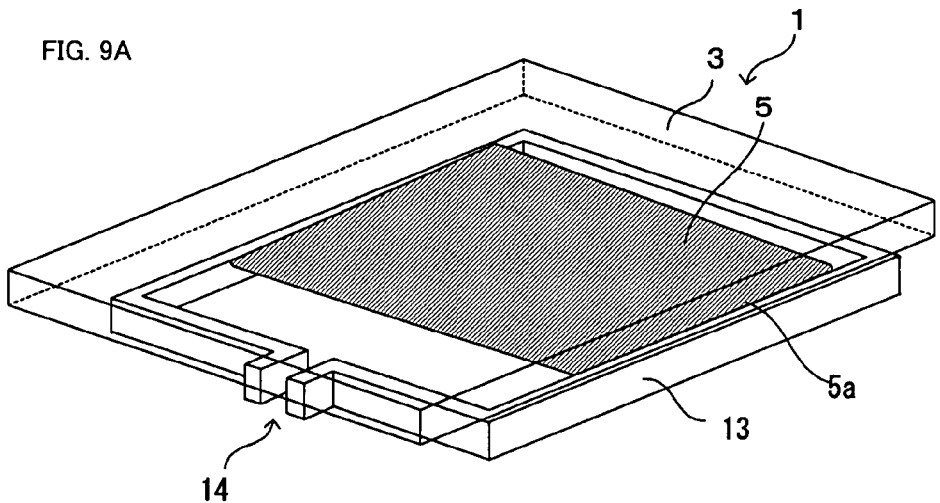
FIG. 9 is a schematic perspective view for explaining the third configuration example of the liquid crystal optical modulator in accordance with the present invention.
Figure 9B:
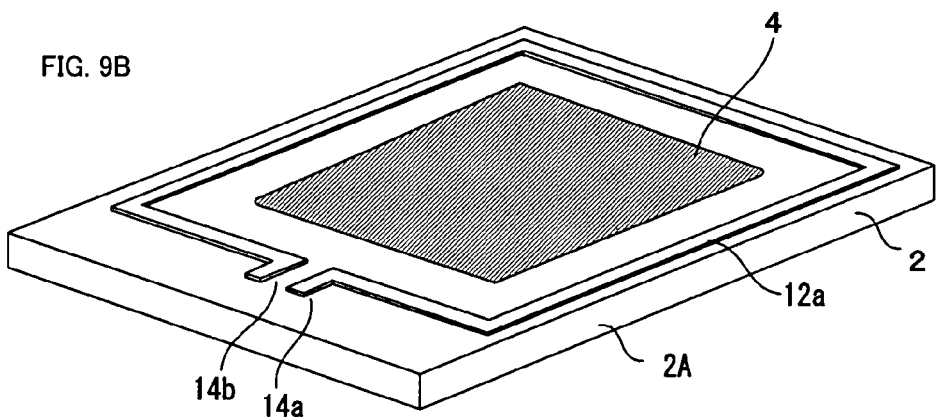
Figure 9C:
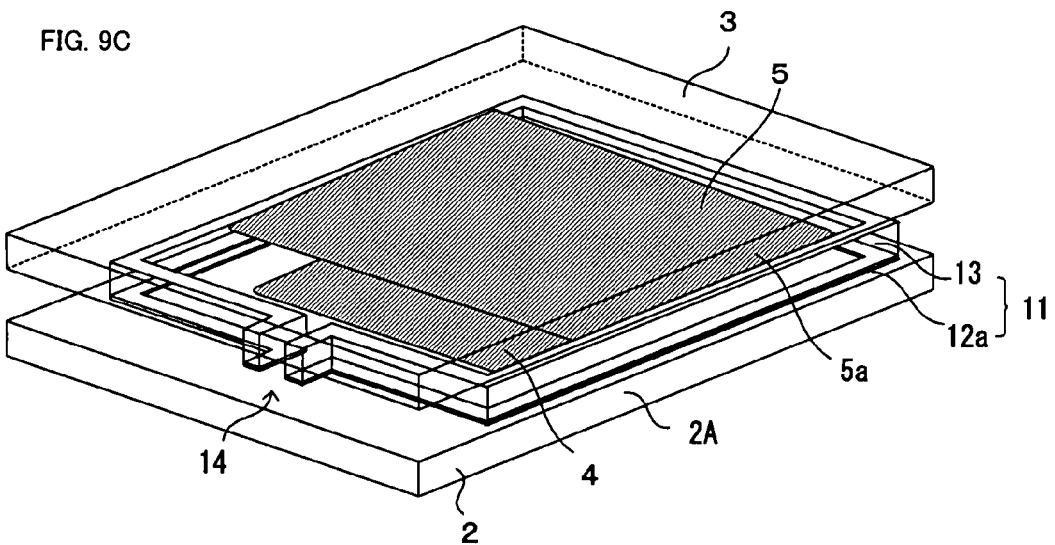

FIG. 9 is a perspective view illustrating schematically the third configuration example of a liquid crystal optical modulator 1. FIG. 9A shows a second substrate 3 comprising a glass substrate in which a second electrode (counter electrode) 5 is formed, FIG. 9B shows a first substrate 2 comprising a silicon substrate 2A in which a first electrode (pixel electrode) 4 is formed, and FIG. 9C shows a state in which the second substrate 3 is disposed on the first substrate 2 so that a metal seal 11 is sandwiched between the substrates.

On the silicon substrate 2A equivalent to the first substrate 2, a pixel electrode pattern is formed from Al (aluminum) or the like, and then a first metal film 12a is deposited by using Al (aluminum) or the like. Similarly to the first metal member 12 in the above-described first configuration example, the first metal film 12a configures a member that joins a metal surface with the second metal member 13 and configures a metal seal 11, and this film can be formed by a deposition treatment simultaneously with the pattern of the first electrode (pixel electrode) 4. With such deposition, the thickness of the first metal film 12a can be made equal to the thickness of the first electrode (pixel electrode) 4.

On the other hand, in the second substrate 3, a counter electrode pattern is formed from ITO or ITiO on a transparent substrate such as a glass substrate, similarly to the first substrate 2 of the above-described first and second configurations, and then a second metal member 13 is formed from Al (aluminum) or the like.

The metal seal 11 is configured by bringing the base metal surface of the first metal film 12a and the base metal surface of the second metal member 13 into direct contact with each other and joining them. Similarly to the first configuration example, the metal seal 11 of the third configuration example configures a side wall portion for holding the liquid crystal layer inside the seal, and part of the side wall section forms a frame-like body having an open section for forming an injection port. The frame-like body is closed from above and below with the first substrate 2 and the second substrate 3, thereby configuring the liquid crystal cell.

Similarly to the first configuration example, the metal seal 11 of the third configuration example comprises an injection port 14 for injecting a liquid crystal. The injection port 14 can be configured by forming an open section in both the first metal film 12a and the second metal member 13, or only in one of them. In the configuration in which both the first metal film 12a and the second metal member 13 comprise an open section, the open sections are formed so that the positions of the two open sections match when the metal film and the metal member are disposed opposite each other. As a result, where the base metal surfaces of the first metal film 12a and the second metal member 13 are directly brought into contact and joined, only the open sections remain non-joined and the injection port 14 is formed.

Furthermore, in the configuration in which the open section is provided in either the first metal film or the second metal member, the other (opposite) component has a closed configuration over the entire perimeter and comprises no open section. As a result, where the base metal surfaces of the first metal film 12a and the second metal member 13 are directly brought into contact and joined, the injection port 14 is formed only by the open section of one component. Further, because the thickness of the first metal film 12a is less than that of the second metal member 13, the configuration in which the open section is formed in both the first metal film 12a and the second metal member 13 and the configuration in which the open section is formed in the second metal member 13 (this configuration represents the case where the open section is formed only in one component) are equivalent in terms of easiness of liquid crystal injection.

Further, FIG. 9 shows a configuration in which open sections are provided in both the first metal film 12a and the second metal member 13.

Similarly to the first configuration example, in the configuration shown in FIG. 9, the injection port 14 comprises a wall section 14a obtained by causing part of the wall section of the metal member to protrude outwardly. The frame-like body of the metal member comprises wall sections 14a protruding at both ends thereof, and the two wall sections 14a form the portion sandwiched therebetween as an open section 14b. This open section 14b is linked to the inside of the frame-like body.

Similarly to the first configuration example, the protruding section of the injection port 14 can demonstrate an effect of reducing the permeation of moisture into the liquid crystal layer.

In the third configuration example, the second electrode 5 is guided toward the first substrate 2 by using the metal seal 11 to lead the electrode out, and further the first electrode 4 is led out and the second electrode 5 that was guided to the first substrate 2 is wired by employing the so-called conduction path such as a via hole or a through hole formed in the thickness direction of the silicon substrate 2A.

For this reason, in the third configuration example, because the electrode on the first substrate 2 and the electrode on the second substrate 3 are not short circuited via the metal seal 11, the insulating film that was provided in the second configuration example becomes unnecessary.

The first electrode 4 shown in FIG. 9B is led out via the conduction path formed in the thickness direction of the silicon substrate 2A and is connected to the wiring or circuit located on the silicon substrate 2A. Therefore, the first electrode 4 is electrically insulated and does not come into contact with the first metal film 12a.

Further, in the second electrode 5 shown in FIG. 9A, a lead-out electrode 5a is led out to the outside through the space between the second substrate 3 and the second metal member 13 of the metal seal 11. This lead-out electrode 5a is in contact with the second metal member 13 of the metal seal 11, but because the first metal film 12a that is in contact with the second metal member 13 is electrically insulated from the first electrode 4, the second electrode 5 and the first electrode 4 are prevented from being short circuited.

FIG. 9C shows a state in which the first substrate 2 is below and the second substrate 3 is above.

The production sequence of the third configuration example of the present invention will be explained below with reference to the flowchart shown in FIG. 10 and FIG. 5.

FIGS. 10A and 10C show a portion of the production sequence of the silicon substrate that is the first substrate. FIGS. 10B and 10D show a portion of the production sequence of the glass substrate that is the second substrate.

The second electrode 5 and the second metal member 13 are formed on the glass substrate that is the second substrate 3 by the steps S1 to S4 shown in the flowchart of FIG. 3. FIGS. 10B and 10D show a state after the second electrode (counter electrode) 5 and the second metal member 13 have been formed on the second substrate 3. Here, the lead-out electrode 5a is led out via the space between the second metal member 13 and the second substrate 3. A bonding layer from In or the like may be formed on the joining surface of the second metal member 13 (S6).

On the other hand, in the production of the silicon substrate, patterns of the first electrode (pixel electrode) 4 and the first metal film 12a are formed on the silicon substrate 2A by photolithography and etched (S7).

FIG. 10C shows a state after the first electrode (pixel electrode) 4 and the first metal film 12a have been formed on the silicon substrate 2A shown in FIG. 10A. A bonding layer from In or the like may be formed on the joining surface of the first metal film 12a.

After the first metal film 12a and the second metal member 13 have been formed, an orientation film (not shown in the figure) is formed on the inner portion of the frame-like body where the electrodes have been formed.

The metal surfaces of the first metal film 12a of the first substrate 2 and the second metal member 13 of the second substrate 3 that were formed in the above-described manner are brought into contact and the metal surfaces are directly joined together under pressure, while removing the oxide film present on the contact surfaces by supplying ultrasonic waves to the contact portion. The joining can be also performed by thermal fusion. The formation of the metal seal 11 may be also performed under vacuum (S8).

A space 20 for holding a liquid crystal layer is thus formed by the frame-like body configured by the metal seal 11 formed by the first metal film 12a and the second metal member 13 and by the upper and lower first and second substrates 2, 3. A liquid crystal is injected into this space 20 via the injection port 14 (FIG. 9C). Upon completion of the liquid crystal injection, the injection port 14 is sealed, e.g., with a resin seal such as a UV epoxy resin.

FIG. 10E shows a cross-sectional state of the third configuration example. Referring to FIG. 10E, in the second electrode (counter electrode) 5 formed on the glass substrate that is the second substrate 3, the lead-out electrode 5a is brought into contact and electrically connected to the second metal member 13. Furthermore, the base metal surfaces of the second metal member 13 and the first metal film 12a are brought into direct contact with one another and connected by joining. Therefore, electric conduction from the second electrode to the silicon substrate 2A that is the first substrate 2 can be performed via the second metal member 13 and the first metal film 12a. The so-called conduction path such as a via hole or a through hole is formed in the thickness direction of the silicon substrate 2A, and the connection from the first metal film 12a to a circuit or wiring formed inside the silicon substrate 2A is performed through the conduction path. The first electrode (pixel electrode) 4 formed on the silicon substrate 2A is similarly connected to a CMOS circuit or wiring formed inside the silicon substrate 2A through the conduction path.

A signal from the pixel electrode or counter electrode that was introduced into the silicon substrate 2A can be led out to the outside.

As described hereinabove, because the metal seal 11 can also serve as a conduction path for signals from the counter electrode, an external wiring for leading the signals out from the counter electrode can be unnecessary.

The fourth configuration example of the present invention will be described below with reference to FIGS. 11, 12. The fourth configuration example relates to a configuration in which one substrate is a glass substrate, a pixel electrode is formed on the glass substrate, the other substrate is a silicon substrate, and a counter electrode is formed on the silicon substrate. In this configuration, the metal seal provided between the glass substrate and silicon substrate has no injection port and the injection of liquid crystal is performed by dripping.

Similarly to the third configuration example, the fourth configuration example can employ a reflection-type liquid crystal modulation element of an LCOS (liquid crystal on silicon) type in which one substrate is a silicon substrate and a CMOS circuit such as a drive circuit is formed on the silicon substrate.

Figure 11A:
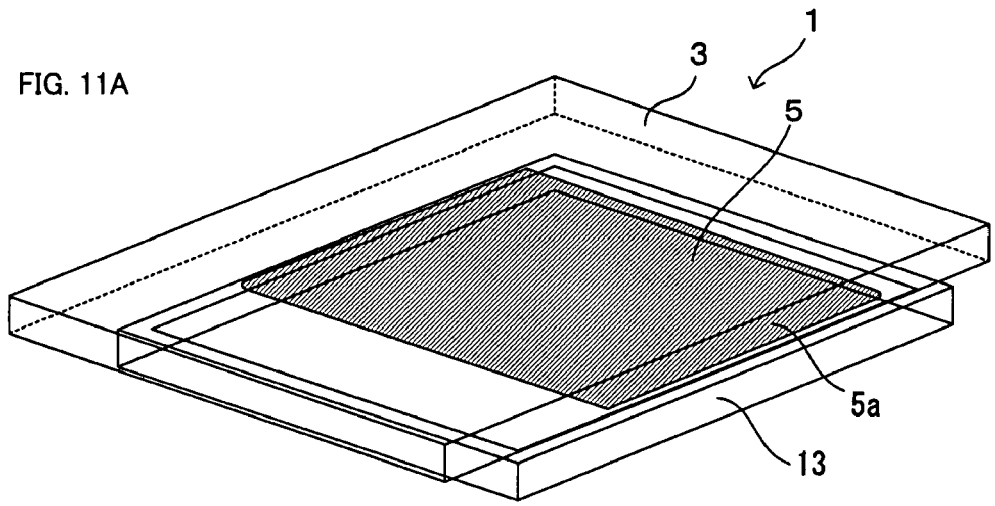
FIG. 11 is a schematic perspective view for explaining the fourth and fifth configuration examples of the liquid crystal optical modulator in accordance with the present invention.
Figure 11B:
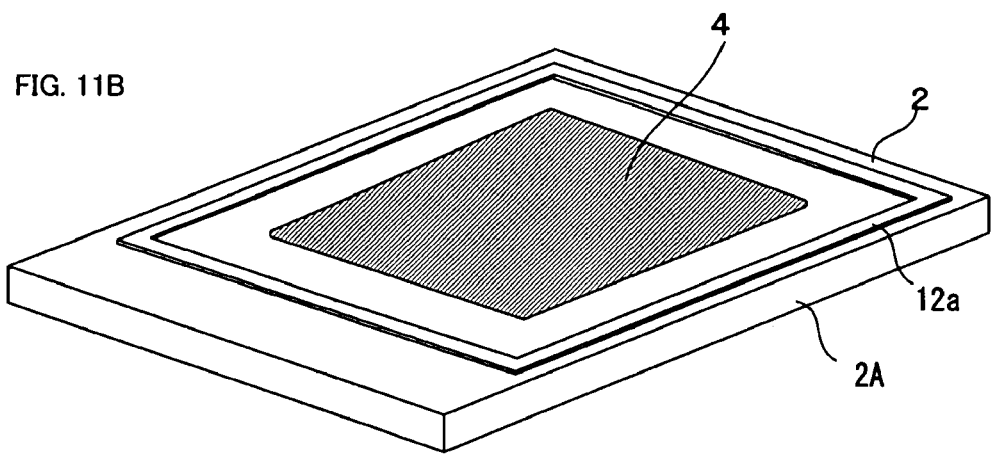
Figure 11C:
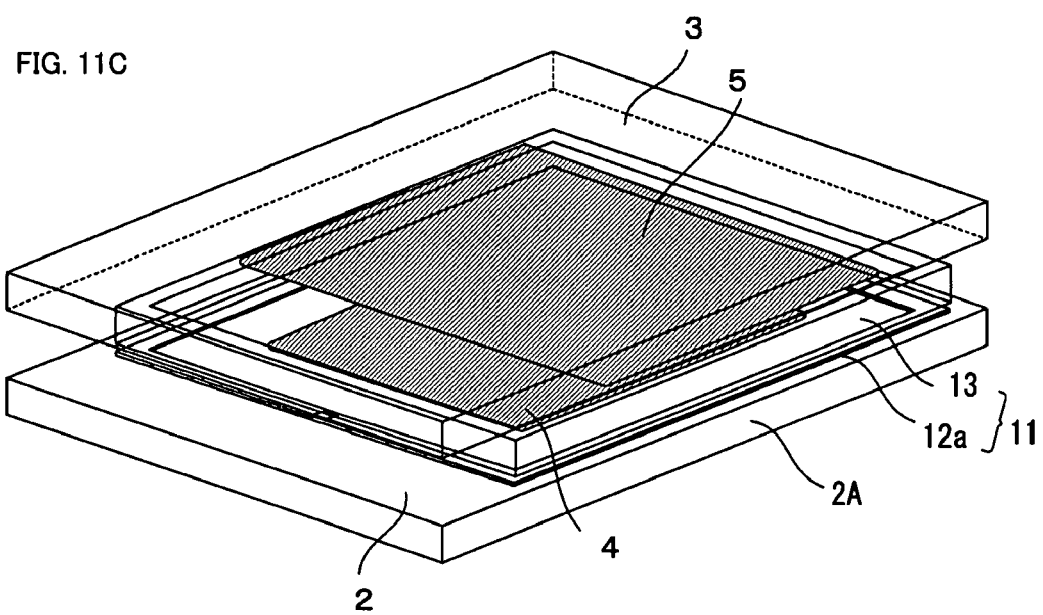

FIG. 11 is a perspective view illustrating schematically the fourth configuration example of a liquid crystal optical modulator 1. FIG. 11A shows a second substrate 3 comprising a glass substrate in which a second electrode (counter electrode) 5 is formed, FIG. 11B shows a first substrate 2 comprising a silicon substrate 2A in which a first electrode (pixel electrode) 4 is formed, and FIG. 11C shows a state in which the second substrate 3 is disposed on the first substrate 2 so that a metal seal 11 is sandwiched between the substrates.

The electrode patterns formed on the substrates are identical to those of the third configuration example. A pixel electrode pattern is formed from Al (aluminum) or the like on the silicon substrate 2A, which is the first substrate 2, and a first metal film 12a is further deposited from Al (aluminum) or the like. Similarly to the above-described first metal member 12, the first metal film 12a configures a member that joins a metal surface with the second metal member 13 and configures a metal seal 11, and this film can be formed by a deposition treatment simultaneously with the pattern of the first electrode (pixel electrode) 4. With such deposition, the thickness of the first metal film 12a can be made equal to the thickness of the first electrode (pixel electrode) 4.

On the other hand, in the second substrate 3, a counter electrode pattern is formed from ITO or ITiO on a transparent substrate such as a glass substrate, similarly to the first substrate 2 of the above-described first and second configurations, and then a second metal member 13 is formed from Al (aluminum) or the like.

Here, the metal seal 11 is configured by bringing the base metal surface of the first metal film 12a and the base metal surface of the second metal member 13 into direct contact with each other and joining the two surfaces. In the metal seal 11 of the fourth configuration example, similarly to the second configuration example, a side wall section is configured for holding a liquid crystal layer inside thereof. The side wall section forms a frame-like body that is closed along the entire perimeter and has no injection port. The frame-like body is closed from above and below with the first substrate 2 and second substrate 3 to form a liquid crystal cell.

In the fourth configuration example, similarly to the third configuration example, the second electrode 5 is guided toward the first substrate 2 by using the metal seal 11 to lead the electrode out, and further the first electrode 4 is led out and the second electrode 5 that was guided to the first substrate 2 is wired by employing the so-called conduction path such as a via hole or a through hole formed in the thickness direction of the silicon substrate 2A.

For this reason, in the fourth configuration example, because the electrode on the first substrate 2 and the electrode on the second substrate 3 are not short circuited via the metal seal 11, the insulating film that was provided in the second configuration example becomes unnecessary.

The first electrode 4 shown in FIG. 11B is led out via the conduction path formed in the thickness direction of the silicon substrate 2A and is connected to the wiring or circuit located on the silicon substrate 2A. Therefore, the first electrode 4 is electrically insulated and does not come into contact with the first metal film 12a.

Further, in the second electrode 5 shown in FIG. 11A, a lead-out electrode 5a is led to the outside through the space between the second substrate 3 and the second metal member 13 of the metal seal 11. This lead-out electrode 5a is in contact with the second metal member 13 of the metal seal 11, but because the first metal film 12a that is in contact with the second metal member 13 is electrically insulated from the first electrode 4, a short circuit between the second electrode 5 and the first electrode 4 is prevented.

FIG. 11C shows a state in which the first substrate 2 is below and the second substrate 3 is above.

The production sequence of the fourth configuration example of the present invention will be explained below with reference to the flowchart shown in FIG. 12, FIG. 5, and FIG. 3.

Figure 12A:
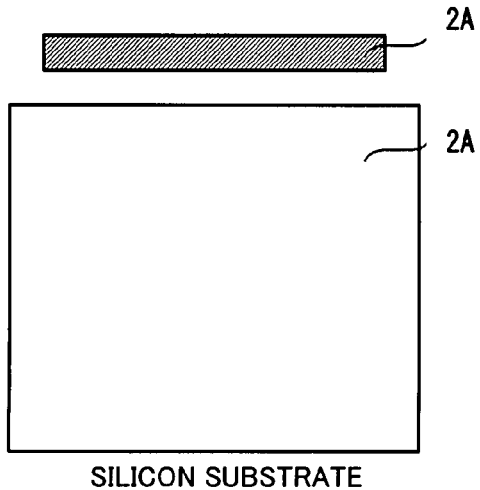
FIG. 12 is a cross-sectional view and a plan view for explaining the fourth and fifth configuration examples of the liquid crystal optical modulator in accordance with the present invention.
Figure 12B:
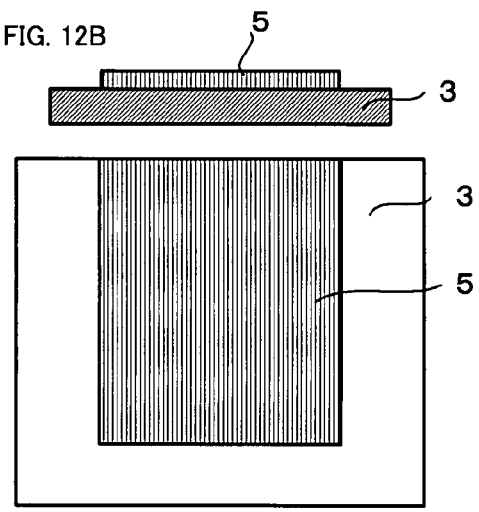
Figure 12C:
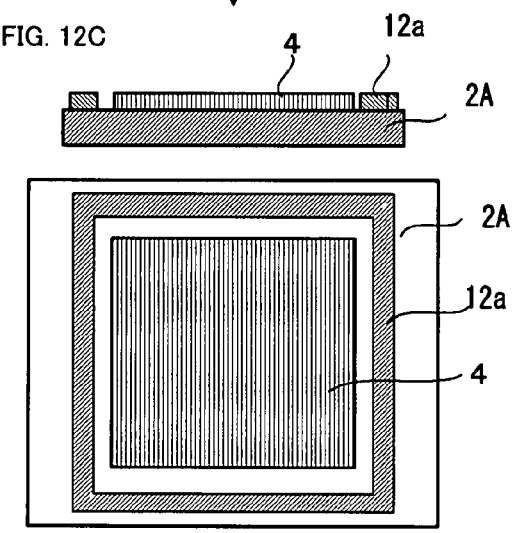
Figure 12D:
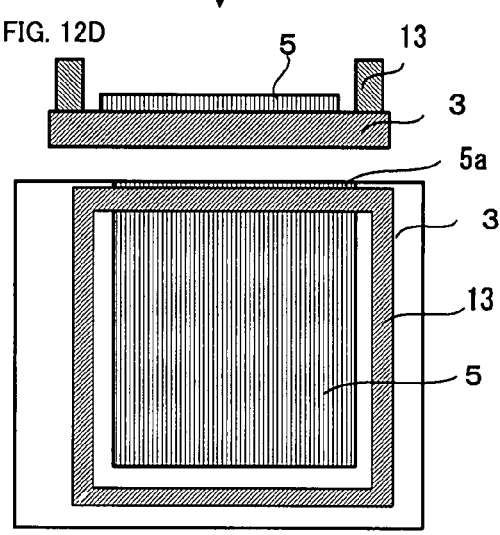

FIGS. 12A and 12C show a portion of the production sequence of the silicon substrate that is the first substrate. FIGS. 12B and 12D show a portion of the production sequence of the second glass substrate that is the second substrate.

The electrode 5 and the second metal member 13 are formed on the second glass substrate by the steps S1 to S4 shown in the flowchart of FIG. 3. FIGS. 12B and 12D show a state after the second electrode (counter electrode) 5 and the second metal member 13 have been formed on the second substrate 3. Here, the lead-out electrode 5a is led out via the space between the second metal member 13 and the second substrate 3. A bonding layer from In or the like may be formed on the joining surface of the second metal member 13 (S6).

On the other hand, in the production of the silicon substrate, patterns of the first electrode (pixel electrode) 4 and the first metal film 12a are formed on the silicon substrate 2A by photolithography and etched (S7).

FIG. 12C shows a state after the first electrode (pixel electrode) 4 and the first metal film 12a have been formed on the silicon substrate 2A shown in FIG. 12A. A bonding layer from In or the like may be formed on the joining surface of the first metal film 12a.

After the first metal film 12a and the second metal member 13 have been formed, an orientation film (not shown in the figure) is formed on the inner portion of the frame-like body where the electrodes have been formed.

Because the metal seal 11 of the fourth configuration example has no injection port for injecting a liquid crystal into the liquid crystal cell, the liquid crystal is injected by dripping. The injection of liquid crystal by dripping can be performed by the same procedure as illustrated by the flowchart shown in FIG. 3. The substrate with the metal member formed thereon is disposed in a vacuum chamber (S11), a liquid crystal is dripped on the substrate (S12), and then the vacuum chamber is evacuated and the liquid crystal is degassed (S13).

The metal surfaces of the first metal film 12a and the second metal member 13 are then brought into contact and the metal surfaces are directly joined together under pressure, while removing the oxide film present on the contact surfaces by supplying ultrasonic waves to the contact portion. Furthermore, the bonding can also be achieved by applying heat and pressure. In this case, even if the orientation film, liquid crystal remainder, and natural oxidation film are present on the metal surfaces of the metal members that serve as joining surfaces, they can be removed by applying ultrasonic waves to the contact surfaces. The formation of the metal seal 11 may be also performed under vacuum (S14).

Figure 12E:
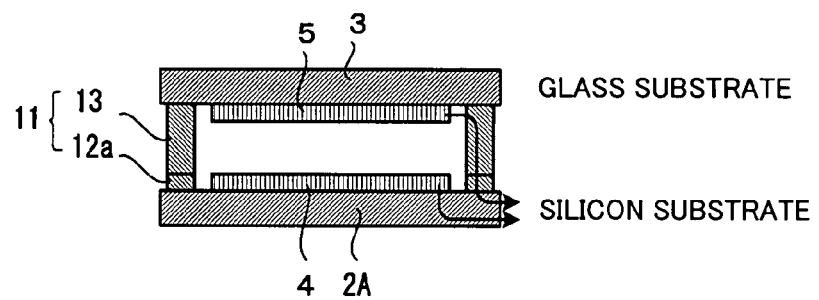

FIG. 12E shows a cross-sectional state of the fourth configuration example. In the configuration shown in FIG. 12E, similarly to the third configuration example shown in FIG. 10, in the second electrode (counter electrode) 5 formed on the glass substrate that is the second substrate 3, the lead-out electrode 5a is brought into contact and electrically connected to the second metal member 13. Furthermore, the second metal member 13 and the first metal film 12a are connected by direct joining of the metal surfaces thereof. Therefore, electric conduction from the second electrode to the silicon substrate 2A that is the first substrate 2 can be performed via the second metal member 13 and the first metal film 12a. The so-called conduction path such as a via hole or a through hole is formed in the thickness direction of the silicon substrate 2A, and the connection from the first metal film 12a to a circuit or wiring formed inside the silicon substrate 2A is performed through the conduction path. The first electrode (pixel electrode) 4 formed on the silicon substrate 2A is similarly connected to a CMOS circuit or wiring formed inside the silicon substrate 2A through the conduction path.

A signal from the pixel electrode or counter electrode that was introduced into the silicon substrate 2A can be led out to the outside.

As described hereinabove, because the metal seal 11 can also serve as a conduction path for signals from the counter electrode, an external wiring for leading the signals out from the counter electrode can be unnecessary.

The fifth configuration example is identical to the fourth configuration example, except that a range where an orientation film is provided is different. In the fourth configuration example, the orientation film is formed on the inner side of the metal seal 11, whereas in the fifth configuration example, the orientation film is formed over the entire substrate.

Figure 13A:
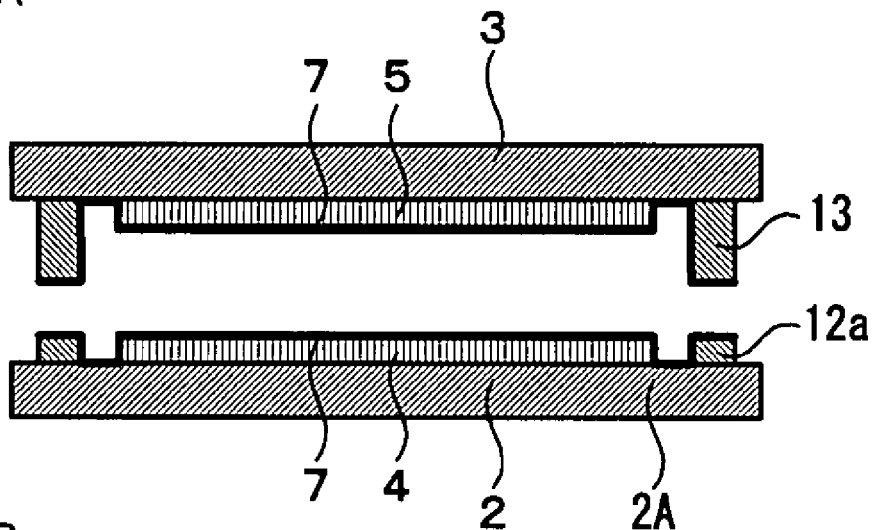
FIG. 13 illustrates the production sequence of a substrate of the fifth configuration example.

FIG. 13 illustrates the production sequence of a substrate of the fifth configuration example. Referring to FIG. 13A, an orientation film 7 is formed over the entire surface of a silicon substrate 2A that is a first substrate 2 having formed thereon the first electrode (pixel electrode) 4 and the first metal film 12a, and the orientation film 7 is also formed on the entire surface of a glass substrate that is the second substrate 3 having formed thereof the second electrode (counter electrode) 5 and the second metal member 13.

Figure 13B:
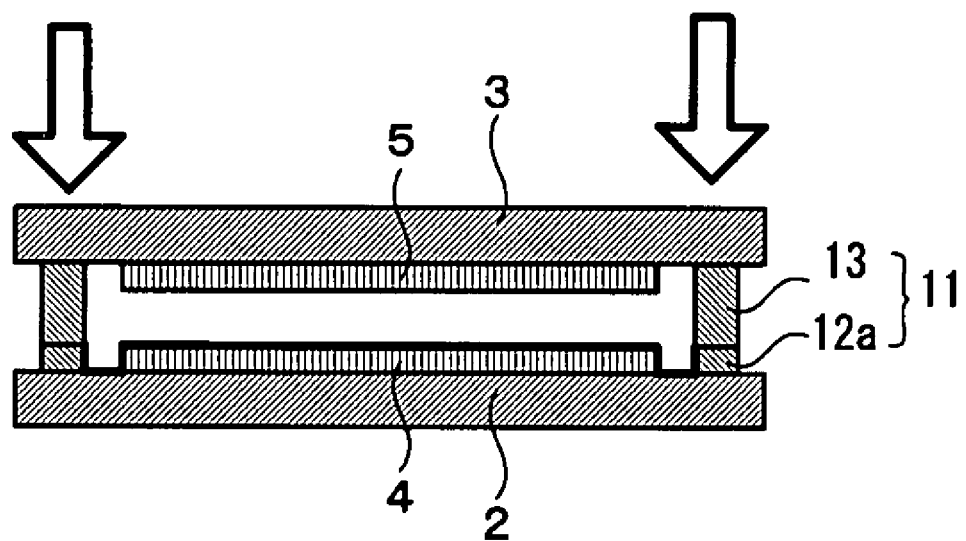

Referring to FIG. 13B, the first and second substrates 2, 3 are set to face each other by the inner surfaces thereof, the first metal film 12a and the second metal member 13 are aligned and brought into contact, ultrasonic waves and pressure are applied thereto, and the metal surfaces of the first metal film 12a and the second metal member 13 are directly joined.

At this time, the orientation film 7 that was formed on the metal surfaces of the first metal film 12a and the second metal member 13 is removed by ultrasonic waves. The orientation film that was formed outside the metal surfaces of the first metal film 12a and the second metal member 13, for example, of the side wall portion, is not removed and remains therein, but because this remaining orientation film does not participate in the process of joining the first metal film 12a and the second metal member 13, the orientation film does not hinder the formation of the metal seal 11.

FIG. 14 shows, in the third to fifth configuration examples, a configuration example relating to the case in which the electric conduction from the counter electrode is performed by using the metal seal as a conduction portion.

Figure 14A:
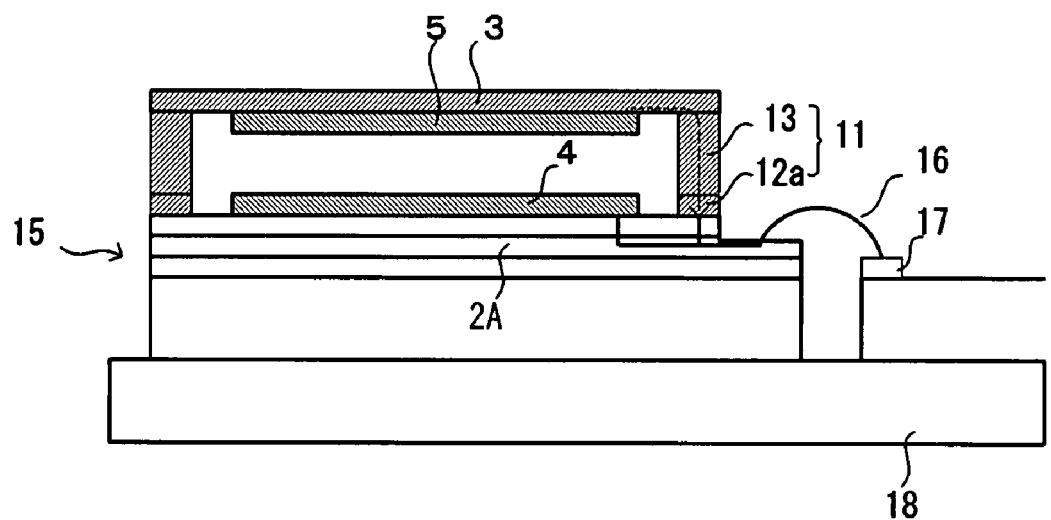
FIG. 14 illustrates a configuration example relating to the case where the conduction of a counter electrode is performed by employing a metal seal as a conduction section in the third to fifth configuration examples.

In the cross-sectional view shown in FIG. 14A, a CMOS circuit 15 is formed on a silicon substrate 2A located on a base 18. The electric conduction between the circuit 15 and the first electrode 4 is performed via a conduction path formed in the thickness direction of the silicon substrate 2A. Further, the conduction between the circuit 15 and the second electrode 5 is performed via the second metal member 13 and the first metal film 12a constituting the metal seal 11 and also via the conduction path formed in the thickness direction of the silicon substrate 2A.

The signals from the electrodes are led to the outside via a wiring formed in the circuit 15 and can be led to an external terminal 17 via an external wiring 16 such as FPC.

Figure 14B:
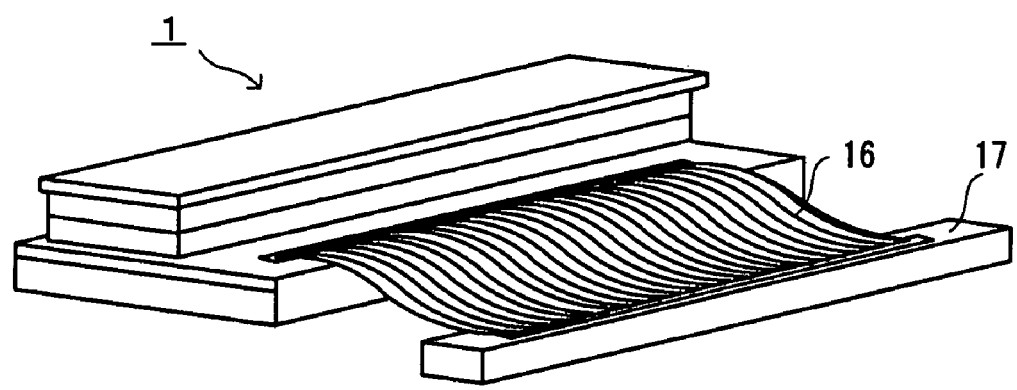

FIG. 14B shows the liquid crystal optical modulator 1, external terminal 17, and external wiring 16 connecting them.

An example in which the liquid crystal optical modulator in accordance with the present invention has a multilayer structure will be described below with reference to FIGS. 15 and 16.

The multilayer structure is a configuration in which a set comprising opposing substrates and a metal seal is taken as a unit and the units are stacked.

Figure 15A:
FIG. 15 illustrates an example of the liquid crystal optical modulator in accordance with the present invention that has a multilayer structure.
Figure 15B:
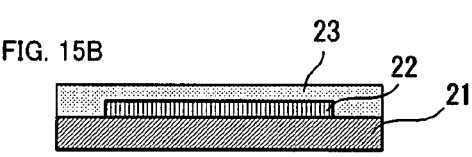
Figure 15C:
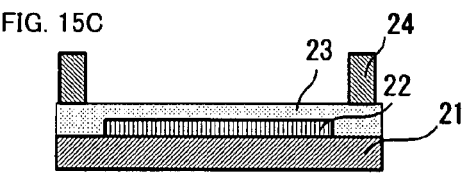
Figure 15D:
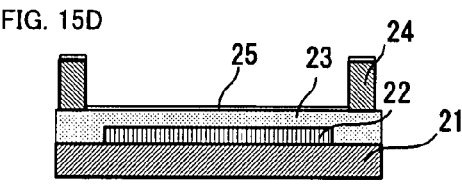
Figure 15E:
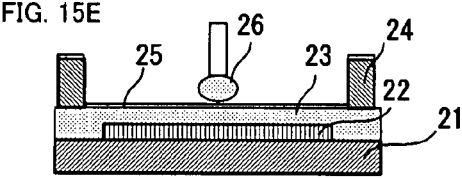

An electrode 22 is formed on a glass substrate 21 (FIG. 15A), a dielectric layer 23 that is a functional dielectric film formed by laminating films with a low refractive index and a high refractive index is selectively provided on the electrode (FIG. 15B), and a metal seal 24 that is a metal member is formed (FIG. 15C). An orientation film 25 is formed above the dielectric layer 23 and the metal seal 24 (FIG. 15d), and a liquid crystal 26 is dripped (FIG. 15E).

Figure 15F:
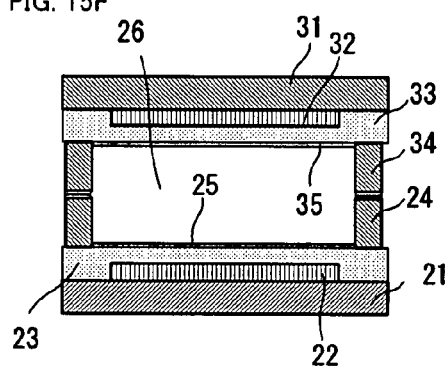

By the process similar to that described hereinabove, a configuration is prepared in which an electrode 32, a dielectric layer 33, a metal seal 34 that is a metal member, and an orientation film 35 are provided on a silicon substrate 31 and a liquid crystal is dripped, and the silicon substrate 31 is placed on the glass substrate 21 so that the metal surfaces of the metal seal 24 that is a metal member and the metal seal 34 are brought into contact (FIG. 15F).

Figure 15G:
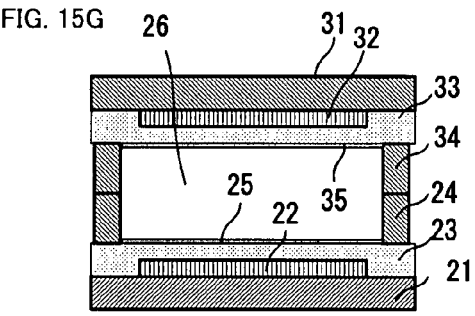
Figure 15H:
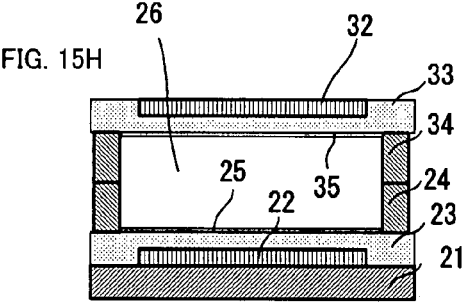
Figure 15I:
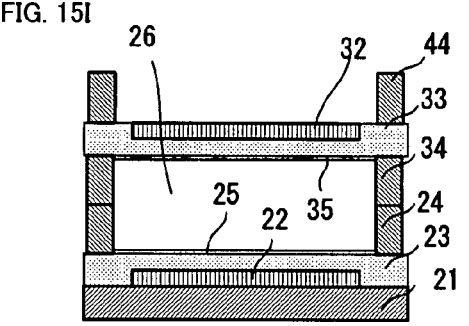
Figure 15J:
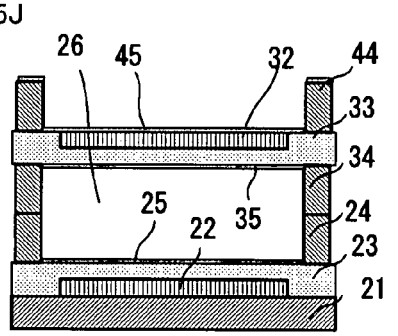
Figure 16A:
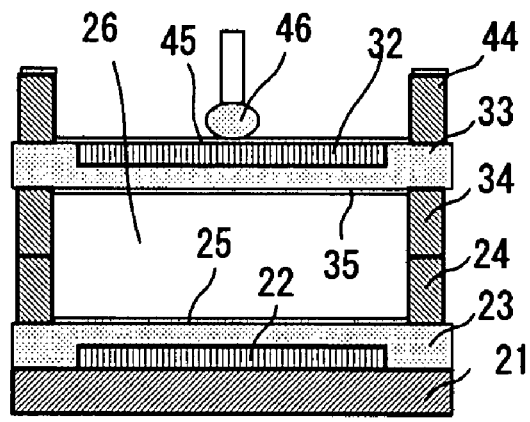
FIG. 16 illustrates an example of the liquid crystal optical modulator in accordance with the present invention that has a multilayer structure.

The contacting metal surfaces of the metal seal 24 and the metal seal 34 are joined under pressure, while applying ultrasonic waves to portions thereof. At this time, the orientation films 25, 35 present on the portions of metal surfaces are removed by ultrasonic waves (FIG. 15G). The silicon substrate 31 is then removed (FIG. 15H), and a metal seal 44 that is a metal member is formed on the dielectric layer 33 (FIG. 15I). An orientation film 45 is formed above the dielectric layer 33 and the metal seal 44 that is a metal member (FIG. 15J), and a liquid crystal 46 is then dripped (FIG. 16A).

Figure 16B:
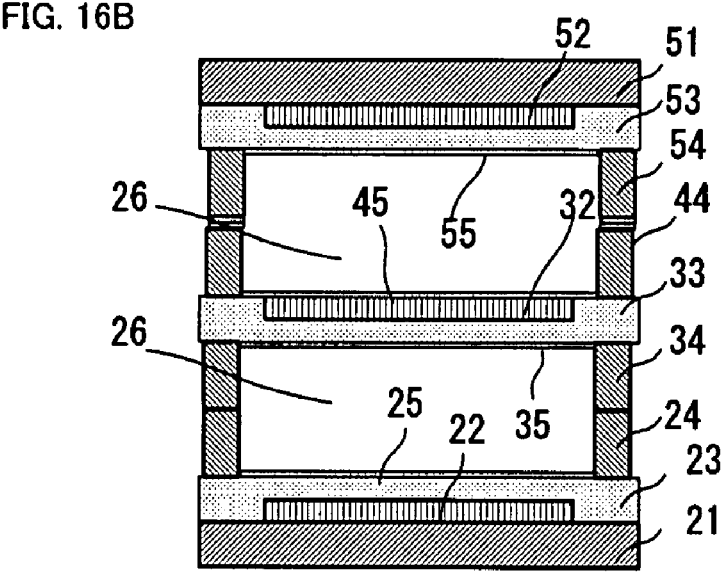

By the process similar to that described hereinabove, a configuration is prepared in which an electrode 52, a dielectric layer 53, a metal seal 54 that is a metal member, and an orientation film 55 are provided on a glass substrate 51 and a liquid crystal is dripped, and the glass substrate 51 is stacked so that the metal surfaces of the metal seal 44 and the metal seal 54 are brought into contact (FIG. 16B). The contacting metal surfaces of the metal seals 44 and 54 are joined under pressure, while applying ultrasonic waves to portions thereof.

Figure 16C:
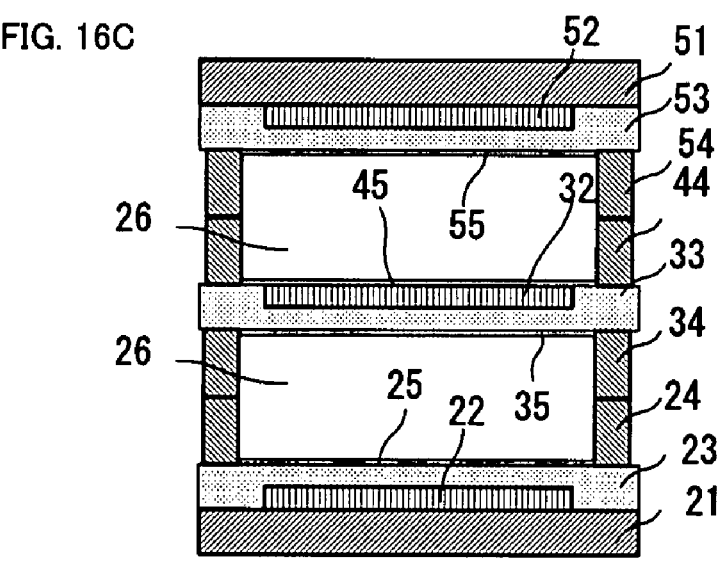

At this time, the orientation films 45, 55 present on the portions of metal surfaces are removed by ultrasonic waves (FIG. 16C).

The above-described example illustrated a configuration in which liquid crystal cells were stacked in two stages, but a multilayer structure comprising a plurality of stages can be formed by using silicon substrates as substrates that are stacked between the cells. Furthermore, in the process illustrated by FIG. 15H, the liquid crystal 26 is present between the dielectric layer 23 and the dielectric layer 33 when the silicon substrate 31 is removed and the dielectric layer 33 is exposed. Therefore, the deformation of the dielectric layer 33 can be minimized. As a result, a plurality of liquid crystal layers can be successively arranged by lamination via the dielectric layers.

In the above-described seal configuration, the base metal surfaces of the first metal member composed of a metal material formed on the first substrate and the second metal member composed of the metal material formed on the second substrate are brought into direct contact and joined together.

In addition of the above-described first configuration, the seal in accordance with the present invention can have a second configuration in which a metal seal is combined with a resin seal. The second seal configuration is a hybrid configuration of a metal and a resin that uses, for example, a metal gasket comprising Al as the main component and combines a sealing function with a gap maintaining function of maintaining a predetermined gap between the substrates.

The second seal configuration will be described below with reference to FIGS. 17 to 21. FIG. 17 is a cross-sectional view illustrating an example of the second seal configuration. FIG. 18 illustrates an example of the sequence for forming a laminated structure with the second seal configuration. FIG. 19 illustrates another sequence of forming a laminated structure with the second seal configuration. FIGS. 20, 21 illustrate the sequence of forming a liquid crystal optical modulator of a multilayer structure by injecting a liquid crystal by a dripping method.

Figure 17A:
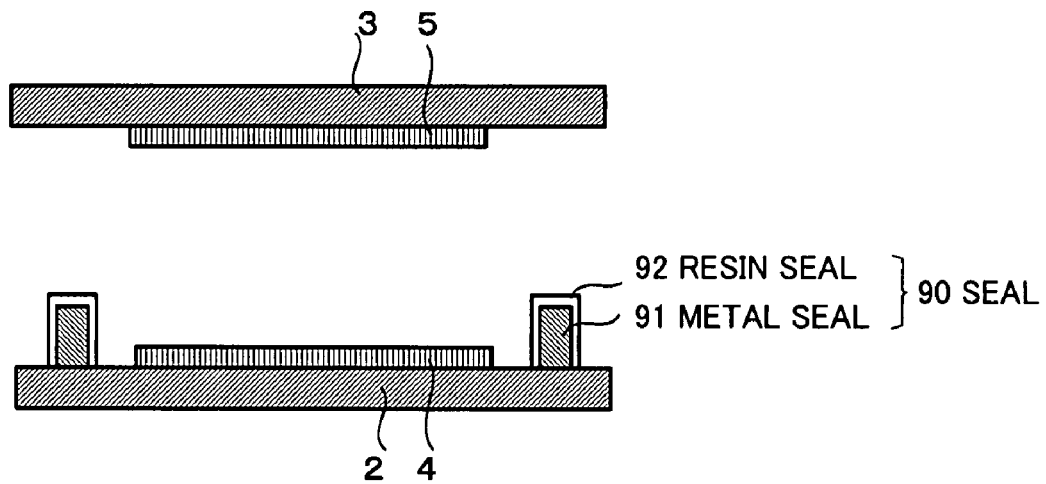
FIG. 17 is a cross-sectional view illustrating a second seal configuration example in accordance with the present invention.

Referring to FIG. 17A, a first electrode (pixel electrode) 4 is formed on a first substrate 2, a second electrode (counter electrode) 5 is formed on a second substrate 3, and then a seal 90 is formed on the first substrate 2. The seal 90 comprises a metal seal 91 and a resin seal 92.

The first electrode (pixel electrode) 4 located on the first substrate 2 and the second electrode (counter electrode) 5 located on the second substrate 3 can be formed, as shown by a flowchart of FIG. 2 and FIG. 3, by forming ITO or ITiO on a glass substrate, forming electrode patterns by photolithography, and then etching an ITO or ITiO pattern with a ferric chloride etchant.

Then, a metal film comprising Al (aluminum) as the main component is formed, a metal member of a frame-like pattern is formed by photolithography, and the metal seal 91 is formed by etching the formed metal member with mixed acid having acetic acid as a main component. At this time, similarly to the configuration shown in FIG. 2, an open section may be formed in the metal member and a lead-out electrode may be led out through the open section. In FIG. 17, the open section and lead-out electrode are not shown. An orientation film (not shown in the figure) is formed on the inner portion of the frame-like body where the electrodes 4, 5 have been formed.

The resin seal 92 is formed on the metal seal 91 that was thus formed and has a width larger than that of the metal seal 91 so as to cover the metal seal 91.

Figure 17B:
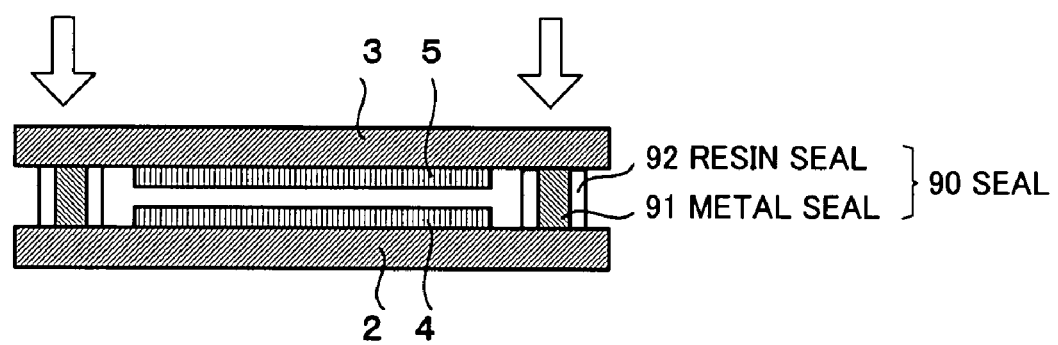

The upper end portion of the seal 90 of the first substrate 2 that was formed in the above-described manner is brought into contact with a metal surface (not shown in the figure) of the metal seal formed on the second substrate 3, and the base metal surfaces are brought into direct contact under applied pressure and joined, while applying ultrasonic waves to the contact portions to remove the resin seal 92 covering the upper end of the metal seal 91 and remove the oxide film present on the contact surfaces (FIG. 17B). The joining can be also performed by thermal fusion under pressure. The formation of the metal seal may be also performed under vacuum.

The metal seal 91 and metal surface (not shown in the figure) of the metal seal formed on the second substrate 3 demonstrate a sealing function by joining the first substrate 2 and the second substrate 3 and also demonstrate a gap maintaining function of maintaining the predetermined distance between the first substrate 2 and the second substrate 3. Further, by adhesively bonding the resin seal 92 to the substrates 2, 3 on the perimeter thereof, except the joining surface of the metal seal 91, the bonding state of the substrates and the seal 90 is improved and the two substrates are better fixed.

A space for holding a liquid crystal layer is formed by the frame-like body configured by the seal 90 and by the upper and lower first and second substrates 2, 3. A liquid crystal is injected into this space via the injection port (not shown in the figures). Upon completion of the liquid crystal injection, the injection port is sealed, e.g., with a resin seal such as a UV epoxy resin.

Alternatively, a frame-like body having no open end may be formed from the seal 90 and a liquid crystal may be dripped into a cavity formed by the first substrate 2, second substrate 3, and seal 90 before joining. At this time, excess liquid crystal oozes out of the seal 90, but the liquid crystal located on the seal 90 during pressure-assisted joining is removed together with the resin seal in the above-described manner.

With this configuration it is possible to prevent the permeation of moisture into the internal liquid crystal layer which was impossible to prevent when resin alone was used and to increase reliability.

FIG. 18 illustrates a first example of a multilayer structure. In this example of the multilayer structure, pressure-assisted joining is performed with the configuration shown in FIG. 17 for each layer and the layers are then successively laminated.

Figure 18A:
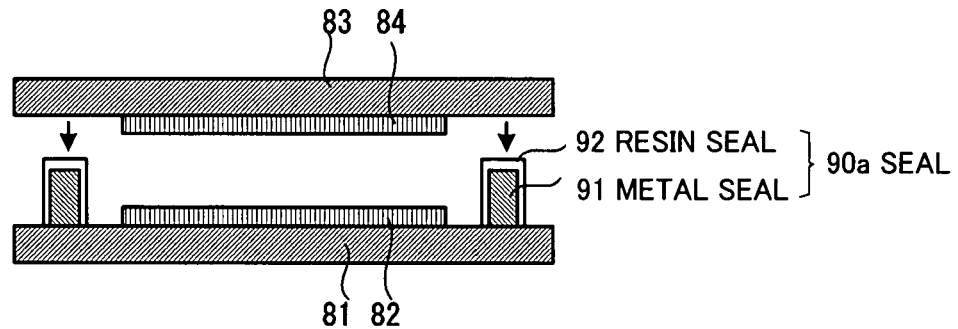
FIG. 18 illustrates an example of a sequence for forming a laminated structure by the second seal configuration in accordance with the present invention.
Figure 18B:
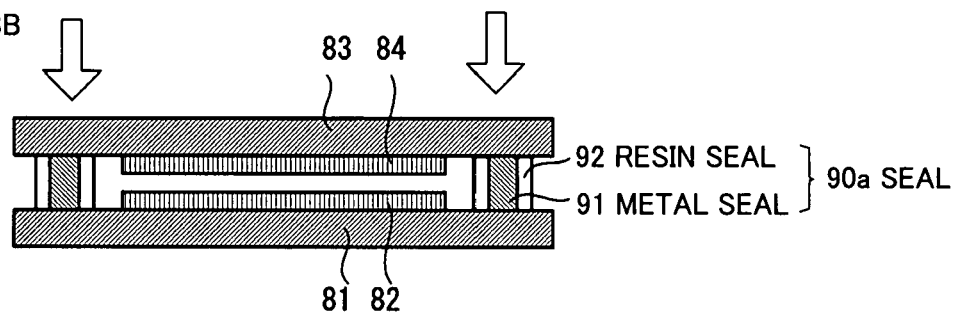

FIGS. 18A, B show a first layer formed by joining a first substrate 81 and a second electrode 83 by a seal 90a comprising a metal seal 91 and a resin seal 92. FIG. 18 illustrates an example of a two-layer structure.

The configuration of the first layer and the joining process are identical to those illustrated by the above-described FIGS. 17A, B. The first substrate 81 is provided with an electrode 82, and the second substrate 83 is provided with an electrode 84.

Figure 18C:
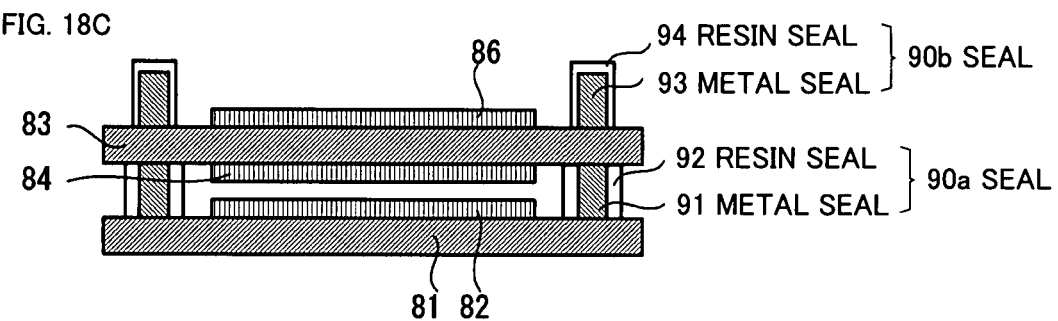

A second layer is formed by placing a third substrate 85 on top of the second substrate 83. FIGS. 18C, D show a portion of the first layer where the first substrate 81 and the second substrate 83 are joined by the seal 90a. The configuration of the first layer and the joining process can be identical to those illustrated by the above-described FIGS. 17A, B.

In order to form the second layer on the second substrate 83, as shown in FIG. 18C, a metal seal 93 is formed on the surface opposite the electrode 84 of the second substrate 83 and then a resin seal 94 is provided so as to cover the metal seal 93, and a seal 90b is formed. An electrode 86 is provided together with the seal 90b on the second substrate 83.

Figure 18D:
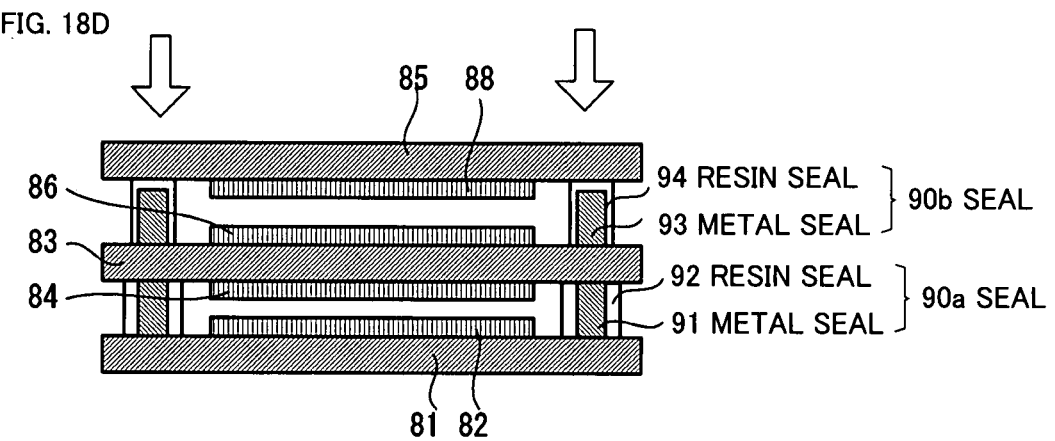

A metal surface (not shown in the figure) of the metal seal formed on the third substrate 85 is brought into contact with the upper end of the seal 90b formed on the second substrate 3, and the contact portions are brought into direct contact and joined under pressure, while removing the resin seal 94 that covers the upper end of the metal seal 93 and also removing the oxide film located on the contact surfaces by applying ultrasonic waves to the contact portion (FIG. 18D). The joining can be also performed by thermal fusion under pressure.

FIG. 19 shows a second example of a multilayer structure. In this multilayer structure, a laminated structure is formed by stacking substrates via a seal in each layer, and then the contact portions of the seals and substrates are joined by pressure application. FIG. 19 illustrates an example of a two-layer structure.

An electrode 82 and a metal seal 91 are formed on a first substrate 81, and then a resin seal 92 is provided so as to cover the metal seal 91. The metal seal 91 and the resin seal 92 form a seal 90a. Similarly, an electrode 86 and a metal seal 93 are formed on a second substrate 83, and then a resin seal 94 is provided so as to cover the metal seal 93. The metal seal 93 and resin seal 94 form a seal 90b. An electrode 84 that faces the electrode 82 of the first substrate 81 is formed on the surface of the second substrate 83 that is opposite the electrode 86. An electrode 88 that faces the electrode 86 of the second substrate 83 is formed on the third substrate 85.

Figure 19A:
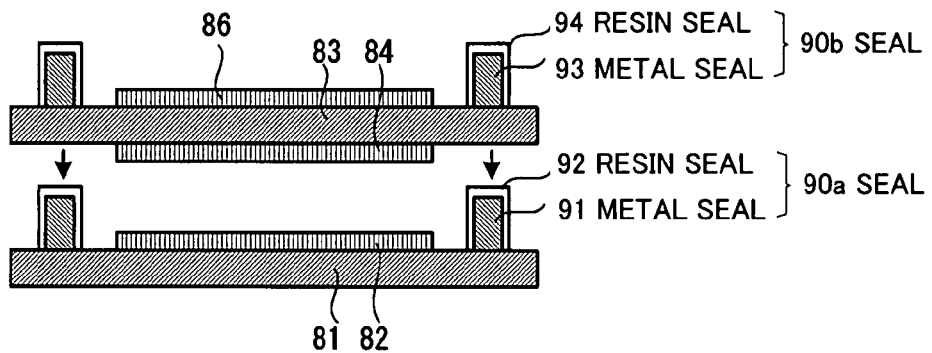
FIG. 19 illustrates an example of another sequence for forming a laminated structure by the second seal configuration in accordance with the present invention.
Figure 19B:
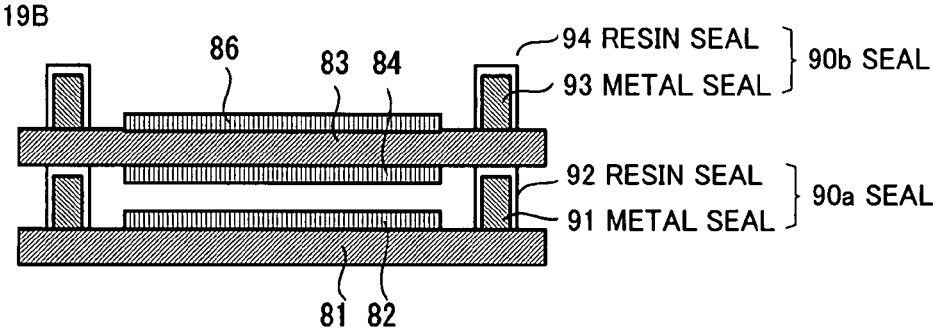
Figure 19C:
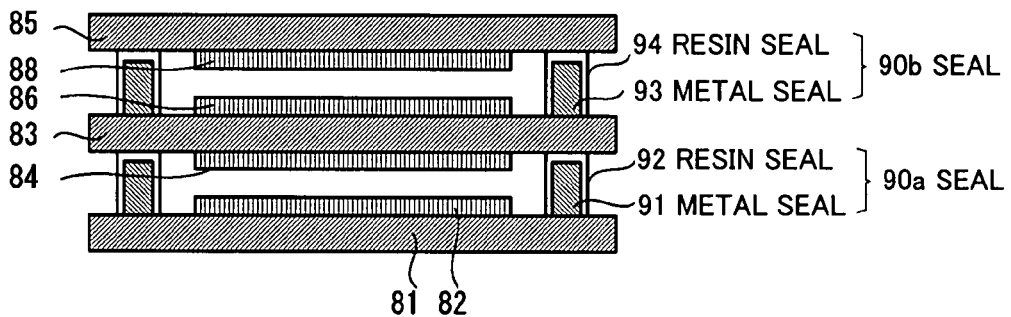

The second substrate 83 is placed on the first substrate 81 (FIG. 19A), and a metal surface (not shown in the figure) of the metal seal formed on the second substrate 83 is placed on the seal 90a formed on the first substrate 81 (FIG. 19B). Further, the third substrate 85 is placed on the second substrate 83, and a metal surface of a metal seal (not shown in the figure) formed on the third substrate 85 is placed on the seal 90b formed on the second substrate 83 (FIG. 19C).

Figure 19D:
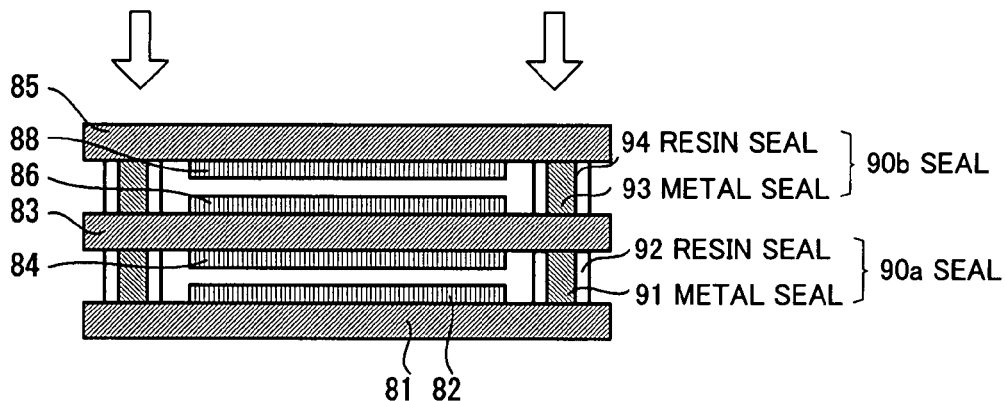

After the first substrate 81, second substrate 83, and third substrate 85 have been stacked via the seals 90a, 90b, the base metal surfaces are brought into direct contact and joined under pressure, while removing the resin seals 92, 94 that cover the upper ends of the metal seals 91, 93 and also removing the oxide film located on the contact surfaces by applying ultrasonic waves to the contact portions (FIG. 19D). The joining can be also performed by thermal fusion under pressure.

FIG. 20 and FIG. 21 show an example in which a liquid crystal optical modulator is formed of a multilayer structure. This multilayer structure represents an example in which a set comprising opposing substrates and a seal is taken as a unit and liquid crystal injection is performed by dripping, as shown in FIGS. 15, 16.

Figure 20A:
FIG. 20 illustrates a sequence of forming a liquid crystal optical modulator of a multilayer structure by liquid crystal injection by a dripping method in accordance with the present invention.
Figure 20B:
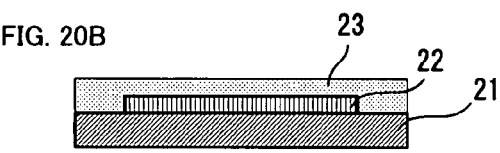
Figure 20C:
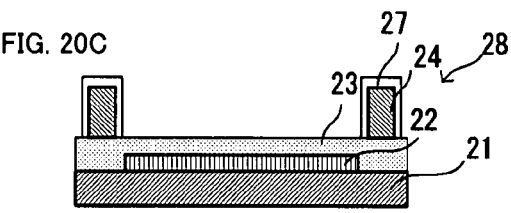
Figure 20D:
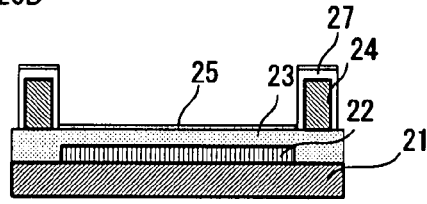
Figure 20E:
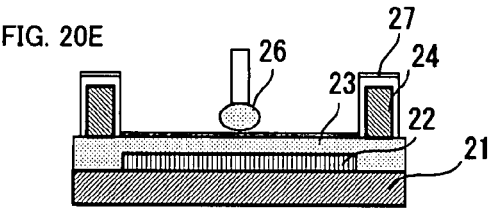

An electrode 22 is formed on a glass substrate 21 (FIG. 20A), a dielectric layer 23 that is a functional dielectric film formed by laminating films with a low refractive index and a high refractive index is selectively provided on the electrode (FIG. 20B), a metal seal 24 comprising a metal member is formed, and a resin seal 27 comprising a resin material is provided so as to cover the metal seal 24, whereby a seal 28 is formed (FIG. 20C). An orientation film 25 is formed above the dielectric layer 23 and the resin seal 27 of the seal 28 (FIG. 20D), and a liquid crystal 26 is dripped (FIG. 20E).

Figure 20F:
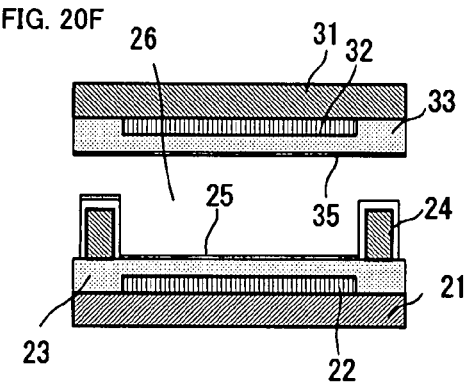
Figure 20G:
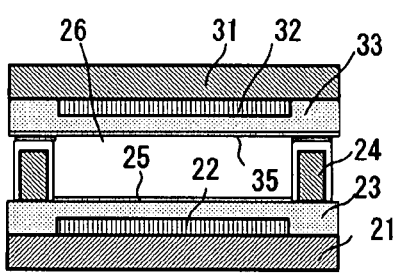

By the process similar to that described hereinabove, a configuration is prepared in which an electrode 32, a dielectric layer 33, a metal seal (not shown in the figures), and an orientation film 35 are provided on a silicon substrate 31, and the silicon substrate 31 is placed on the glass substrate 21 so that the metal surfaces (not shown in the figures) of the metal seal formed on the dielectric layer 33 and the seal 28 are brought into contact (FIGS. 20F, G).

Figure 20H:
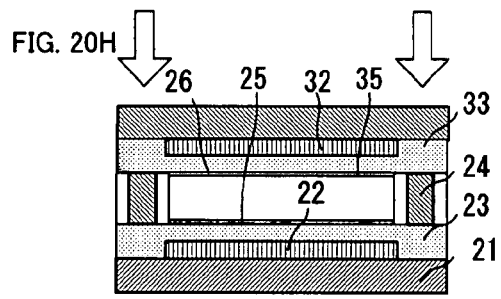
Figure 20I:
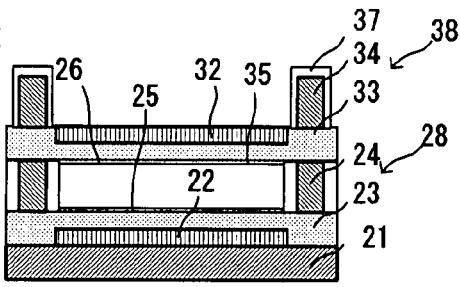
Figure 20J:
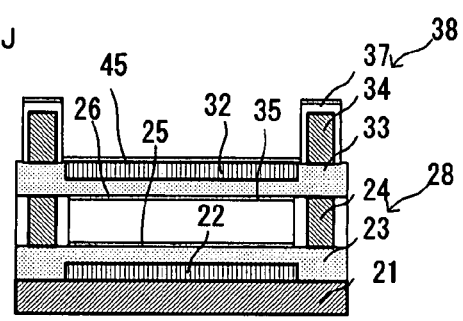
Figure 21A:
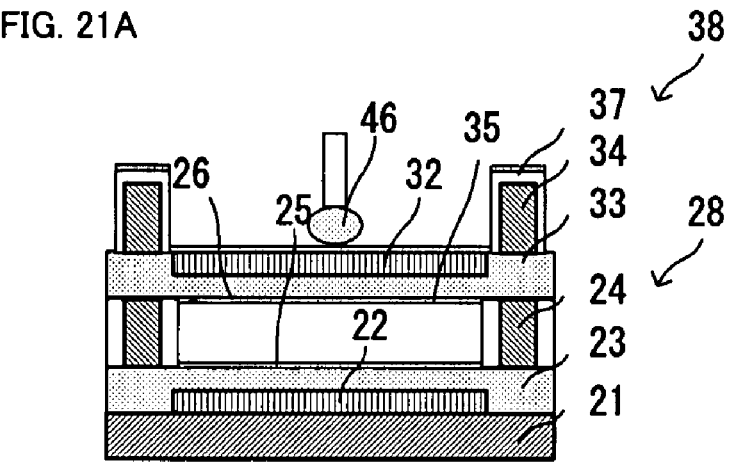
FIG. 21 illustrates a sequence of forming a liquid crystal optical modulator of a multilayer structure by liquid crystal injection by a dripping method in accordance with the present invention.

The contacting portions of the upper end portion of the seal 28 and the metal surface (not shown in the figure) of the metal seal formed on the dielectric layer 33 are joined under pressure, while applying ultrasonic waves thereto. At this time, the resin seal 27 of the seal 28 and the orientation films 25, 35 are removed by ultrasonic waves (FIG. 15G), and the metal surface of the metal seal 27 and the metal surface (not shown in the figure) of the metal seal formed on the dielectric layer 33 are brought into direct contact with each other (FIG. 20H). The silicon substrate 31 is then removed, a metal seal 34 comprising a metal member is formed on the dielectric layer 33, and then a resin seal 37 comprising a resin material is provided so as to cover the metal seal 34, thereby forming a seal 38 (FIG. 20I). An orientation film 45 is formed above the electrode 32, dielectric layer 33 and resin seal 37 of the seal 38 (FIG. 20J), and a liquid crystal 46 is then dripped (FIG. 21A).

Figure 21B:
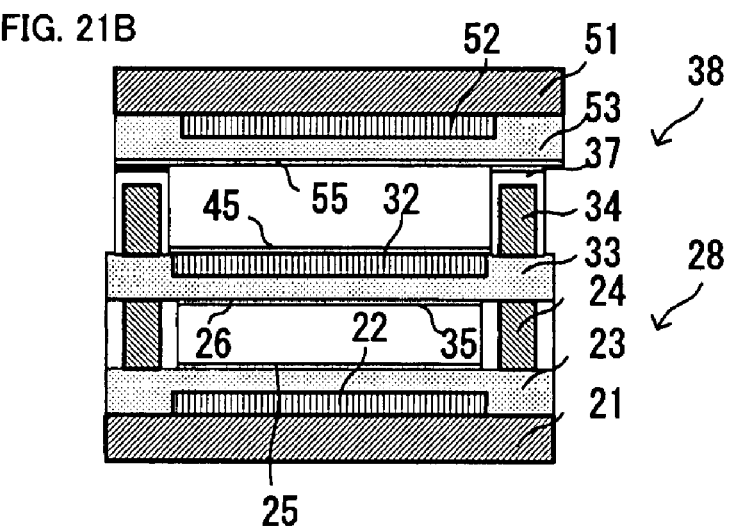

By the process similar to that described hereinabove, a configuration is prepared in which an electrode 52, a dielectric layer 53, a metal seal (not shown in the figures), and an orientation film 55 are provided on a glass substrate 51, and the silicon substrate 51 is stacked so that the metal surfaces (not shown in the figures) of the metal seal formed on the dielectric layer 53 and the seal 38 are brought into contact (FIG. 21B).

Figure 21C:
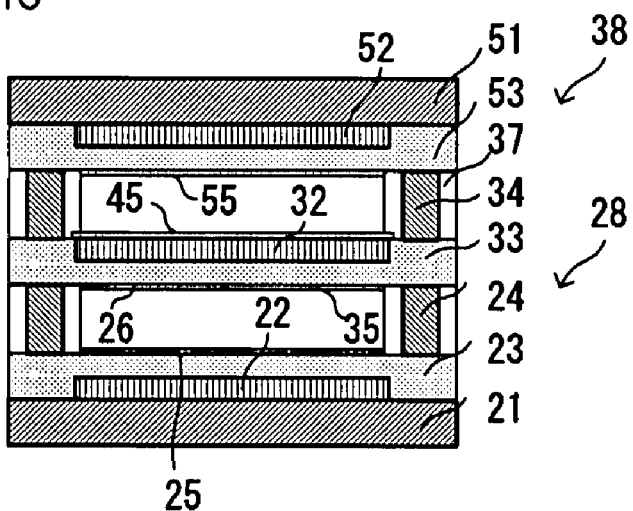
Figure 22:
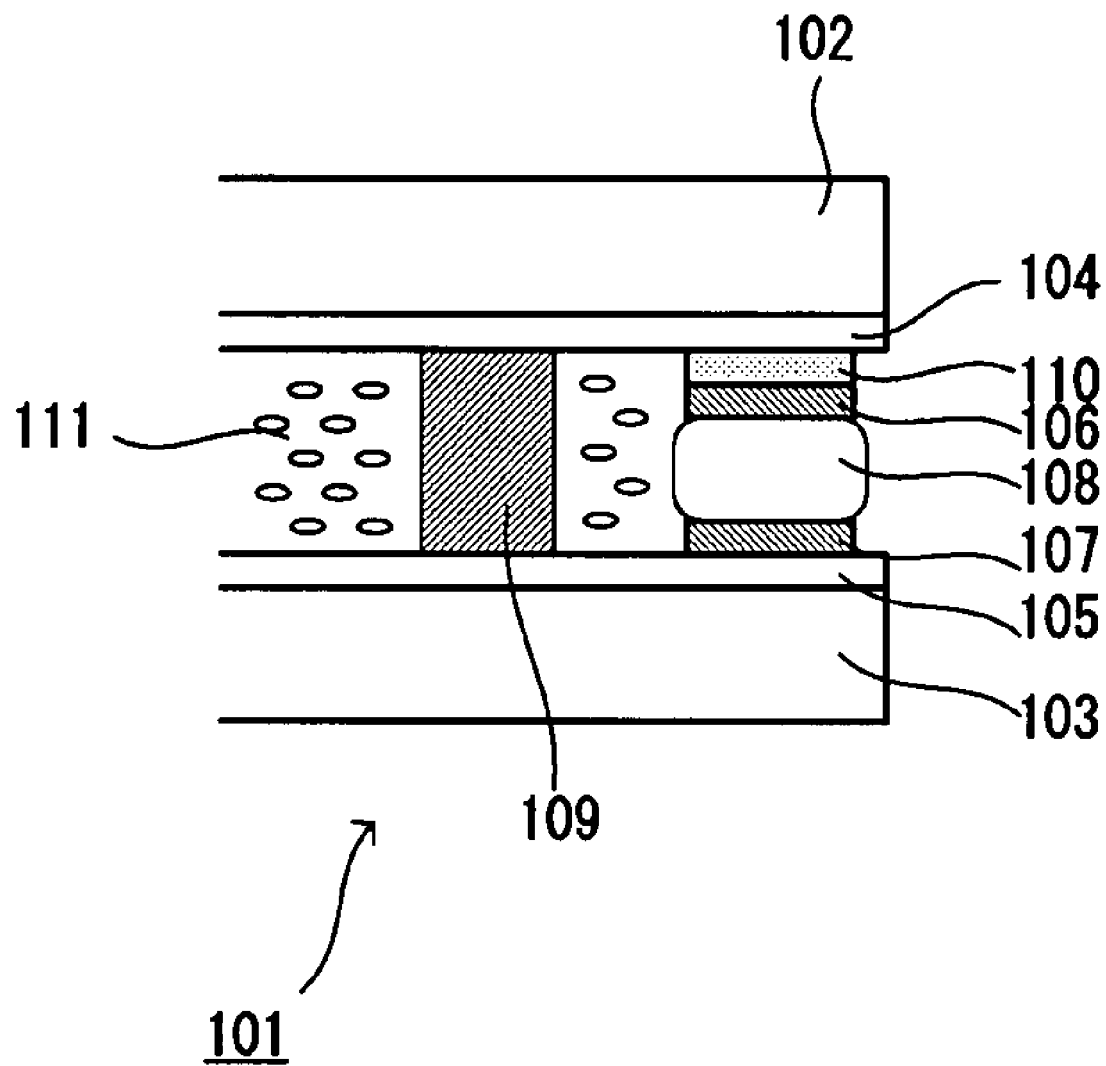
FIG. 22 is an example of a seal structure in which a low-melting metal such as a solder is introduced between metal films.

The contacting portions of the upper end portion of the seal 38 and the metal surface (not shown in the figure) of the metal seal of the dielectric layer 53 are joined under pressure, while applying ultrasonic waves thereto. At this time, the resin seal 37 of the seal 38 and the orientation films 45, 55 are removed by ultrasonic waves, and the metal surface of the metal seal 37 and the metal surface (not shown in the figure) of the metal seal located on the dielectric layer 53 are brought into direct contact with each other (FIG. 21C).

The preferred embodiments of the liquid crystal optical modulator in accordance with the present invention are described above, but it goes without saying that the liquid crystal optical modulator in accordance with the present invention is not limited to the above-described embodiments and that various changes can be made within the scope of the present invention.

What is claimed is:

1. A liquid crystal optical modulator comprising:
a first substrate and a second substrate having electrode patterns on opposing surfaces, the electrode patterns being arranged opposite each other, and
a seal sandwiched and disposed between the substrates, wherein
the seal has metal members that are brought into direct contact and joined by base metal surfaces thereof between the metal members on the substrate sides, and
the metal members form a space that maintains a predetermined distance between the substrates and accommodates a liquid crystal layer between the substrates; wherein
the metal members are formed of a metal material comprising aluminum as a main component.

2. A liquid crystal optical modulator comprising:
a first substrate having a first electrode pattern including a pixel electrode;
a second substrate having a second electrode pattern including a counter electrode; and
a seal sandwiched and disposed between the first substrate and the second substrate, wherein
in a first metal member comprising a metal material and formed on the first substrate and a second metal member comprising a metal material and formed on the second substrate of the seal, base metal surfaces of the two metal members are brought into direct contact and joined with each other; and
the two metal members maintain a predetermined distance between two electrode patterns including the first electrode pattern and the second electrode pattern that are disposed opposite each other on the inner side, and form a space for accommodating a liquid crystal layer between the electrode patterns; and
the first metal member and the pixel electrodes are formed to have the same thickness.

3. A liquid crystal optical modulator comprising:
a first substrate having a first electrode pattern including a pixel electrode;
a second substrate having a second electrode pattern including a counter electrode; and
a seal sandwiched and disposed between the first substrate and the second substrate, wherein
the seal has a metal seal section comprising a metal material that is joined to both substrate surfaces of the first substrate and the second substrate and a resin seal section that covers the circumference of the metal seal section;
in the metal seal section, metal members are disposed between the first substrate and the second substrate, and at the metal surfaces of the metal members and two substrates, base metal surfaces of the two metal members are brought into direct contact and joined with each other;
the resin seal section is tightly attached to a circumference of the metal seal section and the substrates by a resin material; and
the metal seal section maintains a predetermined distance between two electrode patterns including the first electrode pattern and the second electrode patterns that are disposed opposite each other on the inner side, and forms a space for accommodating a liquid crystal layer between the electrode patterns; and
both the metal members are formed of a metal material comprising aluminum as a main component.

4. The liquid crystal optical modulator according to claim 2, wherein
both the metal members are formed of a metal material comprising aluminum as a main component.

5. The liquid crystal optical modulator according to claim 2 or 3, wherein
the first electrode pattern is a pattern formed from a metal material comprising aluminum as a main component,
the second electrode pattern is a pattern formed from a transparent electrically conductive film, and
the second substrate is a transparent substrate.

6. The liquid crystal optical modulator according to claim 5, wherein
the first substrate is a silicon substrate.

7. The liquid crystal optical modulator according to claim 1, wherein a laminate of the first substrate, second substrate, and seal is formed as a structural unit, and a plurality of the laminates are stacked and laminated to obtain a multilayer structure in the lamination direction.

8. The liquid crystal optical modulator according to claim 7, wherein
in the multilayer laminate, a first substrate of one laminated body from amongst adjacent laminated bodies and a second substrate of another laminated body are configured of one common substrate.

9. The liquid crystal optical modulator according to claim 2, wherein
the seal is a frame-like body closed over the entire perimeter of a side section thereof;
the side section of the frame-like body is formed so that the inside of the frame-like body is closed by a side wall of the first metal member or by a side wall of the first metal member and a side wall of the second metal member; and an upper section and a lower section of the frame-like body are closed by the first substrate and the second substrate.

10. The liquid crystal optical modulator according to claim 9, wherein the liquid crystal layer is sealed inside the seal of a frame-like body by a dripping method.

11. The liquid crystal optical modulator according to claim 2, wherein the seal is a frame-like body having an injection port, in the frame-like body, the side section thereof is formed by closing the inside of the frame-like body with a side wall of the first metal member or by a side wall of the first metal member and a side wall of the second metal member, except an open section in part thereof, and an injection port for injecting a liquid crystal into the frame-like body from the open section is formed.

12. The liquid crystal optical modulator according to claim 11, wherein a side wall of the first metal member forming the open section, or a side wall of the first metal member and a side wall of the second metal member forming the open section are caused to protrude in the direction of extension from the open section and a path connecting the inside of the seal with the outside is formed by the protruding section.

13. The liquid crystal optical modulator according to claim 12, wherein the protruding section forms a lead-out electrode in which a portion of the electrode formed on the substrate is led out to the outside of the seal.

14. The liquid crystal optical modulator according to claim 13, wherein the first electrode or the counter electrode, or both electrodes form a lead-out electrode by extending the electrode from the inside of the seal to the outside thereof on the substrate, and an insulating film is provided between the lead-out electrode and the metal member forming the seal, and the lead-out electrode and seal are insulated from each other.

15. The liquid crystal optical modulator according to claim 13, wherein the second electrode pattern forms a lead-out electrode by extending the electrode from the inside of the seal to the outside thereof on the substrate, the lead-out electrode and the seal are electrically connected to each other by forming a metal member forming the seal on the lead-out electrode, and conduction from the counter electrode of the second electrode pattern to the substrate where the other electrode pattern is formed is provided through the metal member forming the seal.

16. The liquid crystal optical modulator according to claim 2, wherein the metal surfaces of the first metal member and the second metal member are joined by applying pressure and supplying ultrasonic waves to the metal surfaces in a contact state.

17. The liquid crystal optical modulator according to claim 16, wherein joining surfaces of the first metal member and the second metal member are joined in a state in which oxides films present thereon are removed by supplying ultrasonic waves.

18. A process of producing a liquid crystal optical modulator having a first substrate having a first electrode pattern including a pixel electrode; a second substrate having a second electrode pattern including a counter electrode; a seal sandwiched and disposed between the first substrate and the second substrate, the process comprising:

forming a first metal member comprising a metal material on the first substrate;

forming a second metal member comprising a metal material on the second substrate;

disposing the first metal member and the second metal member opposite each other to obtain a contact state thereof; and forming the seal by bringing base metal surfaces of the two metal members into direct contact joined by applying pressure to the metal surfaces in the contact state, wherein both the first metal member and the second metal member are formed of a metal material comprising aluminum as a main component.

19. The process of producing a liquid crystal optical modulator according to claim 18, wherein in the step in which the pressure is applied, ultrasonic waves are supplied to at least a portion to which the pressure is applied, and an oxide film present on the contact surface is removed.

* * * * *